United States Patent
Chen et al.

(10) Patent No.: US 8,160,078 B2
(45) Date of Patent: Apr. 17, 2012

(54) INTER-LOCAL PEER GROUP (LPG) ROUTING METHOD

(75) Inventors: Wai Chen, Parsippany, NJ (US); Marcus Pang, Manalapan, NJ (US); Taek Jin Kwon, Morganville, NJ (US); Ryokichi Onishi, Jersey City, NJ (US); Toshiro Hikita, Tama (JP)

(73) Assignees: Telcordia Technologies, Inc., Piscataway, NJ (US); Toyota Infotechnology Center, U.S.A., Inc., Palo Alto, CA (US)

( * ) Notice: Subject to any disclaimer, the term of this patent is extended or adjusted under 35 U.S.C. 154(b) by 240 days.

(21) Appl. No.: 12/120,690

(22) Filed: May 15, 2008

(65) Prior Publication Data

US 2009/0285213 A1 Nov. 19, 2009

(51) Int. Cl.
H04L 12/28 (2006.01)
H04L 12/50 (2006.01)

(52) U.S. Cl. ......... 370/400; 370/351; 370/367; 370/401
(58) Field of Classification Search .................. None
See application file for complete search history.

(56) References Cited

U.S. PATENT DOCUMENTS

| | | | |
|---|---|---|---|
| 7,177,295 B1 * | 2/2007 | Sholander et al. | 370/338 |
| 7,342,907 B2 | 3/2008 | Kim et al. | |
| 2003/0204625 A1 * | 10/2003 | Cain | 709/243 |
| 2007/0115868 A1 * | 5/2007 | Chen et al. | 370/315 |
| 2007/0280174 A1 * | 12/2007 | Pun | 370/338 |
| 2008/0095163 A1 | 4/2008 | Chen et al. | |

OTHER PUBLICATIONS

International Search Report dated Jul. 1, 2009.

* cited by examiner

*Primary Examiner* — Phirin Sam
*Assistant Examiner* — Sori Aga
(74) *Attorney, Agent, or Firm* — Philip J. Feig

(57) ABSTRACT

An on-demand method of routing data between a plurality of local peer groups (LPG). Each LPG includes a plurality of moving nodes. The method comprises transmitting a route request message from a source node, relaying the route request message to a native boundary node; forwarding the route request message to a foreign boundary node, determining if the destination node is within an LPG for the foreign boundary node; relaying the route request message to another boundary node if the destination node is not within the LPG, relaying the route request message to the destination node if the destination node is within the LPG, receiving the routing request message at the destination node, transmitting a routing response to the source node, relaying the routing response to the source node through a path discovered by the route request, receiving the routing response at the source node, and transmitting the data, upon receipt of the routing response.

13 Claims, 14 Drawing Sheets

INTER-LOCAL PEER GROUP (LPG) ROUTING METHOD

CROSS-REFERENCE TO RELATED APPLICATIONS

The present invention is related to commonly owned, co-pending U.S. patent application Ser. No. 11/585,047 filed Oct. 23, 2006 entitled Method and Communication Device for Routing Unicast and Multicast Messages in an Ad-hoc Wireless Network (the "'047 Application").

FIELD OF INVENTION

This invention relates to a communication network in a mobile environment. More specifically, the invention relates to a method for routing a message between multiple local peer groups.

BACKGROUND

The '047 Application describes a method for organizing groups of moving vehicles into a local peer group (LPGs) by selecting one moving vehicle as a group header, maintaining the local peer group using the group header, and generating local routing information. The moving vehicles are adapted to route data using either a single hop or a multi-hop transmission. The '047 Application describes that specific intra-LPG routes are determined from a local routing table within each node or moving vehicle. The local routing table is created from information that is received by the node from other nodes within the LPG. The routing paths are continually updated. The size of a LPG is preset to ensure that the LPG is a management size. The size is preset based upon a hop count limit.

A network might contain multiple LPGs, where each LPG includes several moving vehicles. Messages are transmitted within a LPG, e.g. intra-LPG communication. However, other messages need to be transmitted between multiple LPGs, e.g. inter-LPG communication. These messages including, but not limited to, urgent road obstacle warning, intersection coordination, hidden driveway warning, lane-change or merging assistance must be able to be transmitted between the LPGs efficiently.

Performance requirements include low latency (on the order of 100 milli-seconds) and sustained throughput (or equivalently, the percentage of neighboring vehicles that successfully receive warning messages) in order to support various applications such as collision avoidance.

Therefore, there is a need for a method for transmitting between multiple local peer groups.

SUMMARY OF THE INVENTION

Accordingly, disclosed is an on-demand method of routing data between a plurality of local peer groups. Each of the local peer groups includes a plurality of moving nodes. The method comprises the steps of transmitting a route request message from a source node, the route request message includes at least a destination node, an LPG identifier of the source node and a previous LPG identifier, relaying the routing request message to the destination node, and issuing a routing response, and routing the response to the source and relaying the route request message to a native boundary node; receiving the routing response at the source node; and transmitting the data, upon receipt of the routing response. The data is initially relayed using a node that transmitted a routing response, however, the actual route is determined from updated local routing tables.

The route request message is relayed to the destination node by forwarding the route request message a foreign boundary node, determining if the destination node is within an LPG for the foreign boundary node, relaying the route request message to another boundary node if the destination node is not within the LPG and relaying the route request message to the destination node if the destination node is within the LPG;

The destination node upon receiving the route request transmits the routing response to the source node. The routing response is relayed to the source node through a path discovered via the route request.

The on-demand method further comprises the step of determining if a node that receives the route request message is the destination node or a boundary node within the LPG for destination node.

The on-demand method further comprises the steps of determining if the destination node is in the same LPG as a node receiving the route request message, determining if a node receiving the route request message is an ingress boundary node, and updating destination list with an identifier for the source node.

The on-demand method further comprises determining if a node receiving the route request message is a relay node.

The on-demand method further comprises the steps of determining if a node receiving the route request message is an egress boundary node and replacing the previous LPG identifier in the route request message with an LPG identifier for an LPG of the egress boundary node.

The on-demand method further comprising the steps of determining if the source node is in the same LPG as a node receiving the routing response; determining if a node receiving the routing response is an ingress boundary node; and updating destination list with an identifier for the destination node.

The on-demand method further comprising the step of determining if a node receiving the routing response is a relay node.

The on-demand method further comprising the steps of determining if a node receiving the routing response is an egress boundary node and replacing a next LPG identifier in the routing response with an LPG identifier for an LPG of the egress boundary node.

The on-demand method further comprising the step of maintaining a route from a source node to a destination node until the data has been received by the destination node.

The step of maintaining a route includes the sub-steps of detecting if a node has changed LPGs, transmitting a notification to all nodes within an LPG that a node has changed LPG, determining if a node that detected a change is a boundary node and adding an identifier for the node that changed LPG into a routing table as a obligated foreign destination.

The routing request message includes a destination node identifier and a previous node identifier.

Also disclosed is a method for selecting boundary nodes for communication between multiple local peer groups. The method comprise the steps of receiving a first control packet that originated from a predetermined node, determining if the first control packet is from a group header in a same local peer group, declaring a candidacy for a boundary node if the first control packet originated from a foreign local peer group, by transmitting a packet to the group header, receiving the transmitted packet from at least one candidate, at the group header, generating a list of candidates based upon the received packet, selecting one candidate from the list of candidates as the boundary node, and transmitting a data packet containing an identifier for the selected boundary node. The predetermined node being a group header.

The list of candidates is valid for a preset period of time. The period of time is a time-to-live value. The time-to-live value is a multiple of a period of transmission of the first control packet. The method further comprises the steps of determining if the preset period of time has expired and removing a candidate if the preset period of time has expired. The method further comprises the step of refreshing a time-to-live value when the group header receives data packet contain an identifier for the same candidate.

The boundary node is selected based upon a hop count from the group header for each candidate.

The method further comprises the steps of receiving the data packet containing an identifier for the selected boundary node, comparing the identifier for the selected boundary node within a receiving node's identifier, and changing a receiving node's status to a boundary node based upon the comparing.

The method further comprises the step of transmitting a second control packet periodically after changing status to a boundary node.

The method comprises the step of selecting a second boundary node, the second boundary node being in an opposite relative direction from the group header as the boundary node.

BRIEF DESCRIPTION OF THE DRAWINGS

These and other features, benefits, and advantages of the present invention will become apparent by reference to the following figures, with like reference numbers referring to like structures across the views, wherein.

DETAILED DESCRIPTION OF THE INVENTION

In accordance with the invention, nodes or moving devices are organized into manageable groups. These groups are used to coordinate transmission of data between the nodes. The groups are built based upon the relative location of neighboring nodes or based upon a fixed location. This grouping or Local Peer Group ("LPG") is the basis for routing radio signals within a single LPG, as well as between LPGs. The radio signals include vehicle safety applications and information applications.

Figure 1:
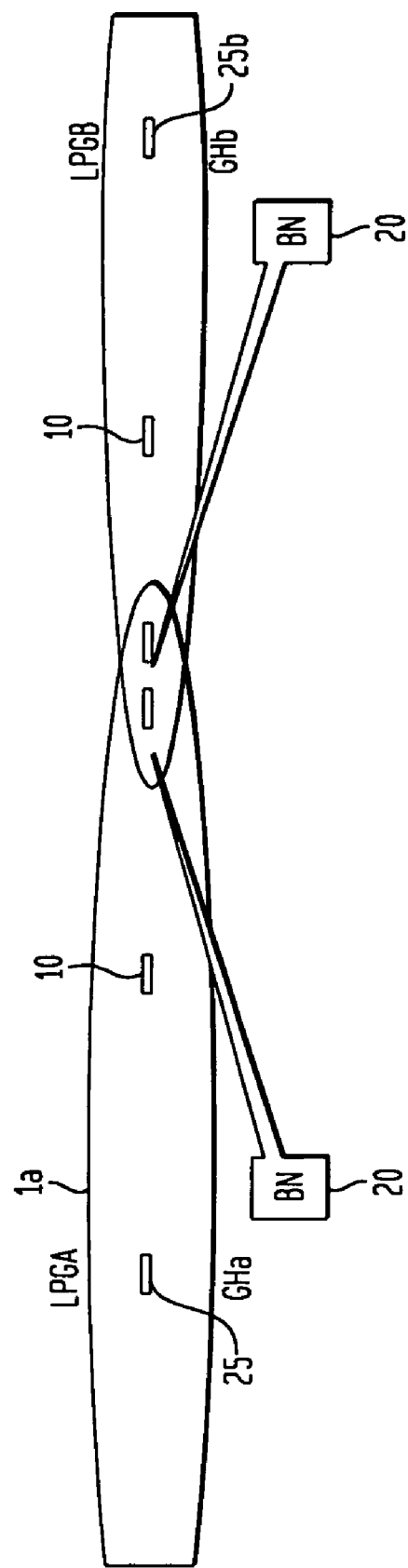
FIG. 1 illustrates multiple local peer groups in proximity of each other adapted for inter-LPG communication according to an embodiment of the invention.

FIG. 1 illustrates two LPGs (generally labeled 1): LPG A ($1_a$) and LPG B $1_b$. LPG A $1_a$ includes three individual nodes (nodes are generally labeled as "10"). One node within an LPG 1 is selected to be a leader of the group. The leader is referred to as a GH, depicted as $GH_a$ for LPG A $1_a$ (GHs are generally labeled as "25"). A GH 25 manages the LPG 1. Additionally, the GH 25 selects special nodes to be a boundary node (BN, generally labeled as "20"). A BN 20 is a node 10 that is responsible for relaying data between multiple LPGs 1. BNs 20 are physically located in an area that has overlapping radio coverage for multiple LPGs 1. The BN 20 is responsible for on-demand route search and maintenance. A BN 20 is also responsible for maintaining a valid route for inter-LPG communication. A BN 20 reports a specific foreign destination list to other nodes 10 as part of its membership report (MR) 300. The specific foreign destination list includes obligated foreign destinations. An obligated foreign destination includes destination whose communication paths are active and the next hop LPG of the foreign destination is the LPG 1 that the BN is located. Additionally, since a BN 20 overhears heartbeat messages 200 and MRs 300 from multiple LPGs 1, the BN 20 also assists in the notification of departing or moving nodes.

The size of a LPG 1 is controlled to avoid too many nodes 10 in a given LPG 1. Specifically, a GH 25 broadcasts a radio signal having a specific format; other nodes 10 within the range of the GH 25 have the ability to receive the radio signal. The radio signal includes a hop count or a Time-to-live (TTL) value in which the signal is valid, i.e., if the signal is relayed for a hop counter greater than the specified value, the node will not join the LPG 1. This radio signal is called a heartbeat message 200. The formation, maintenance, selection of a GH and control of an LPG 1 is described in the '047 Application which is hereby incorporated by reference.

As noted above, there is a region where radio signals from two different LPGs 1 can be heard. In this region, nodes receive two different heartbeat messages 200 are received, however, a node 10 can only join one LPG 1. This overlapping area is called a LPG Intersection area (LIA) A node 10 joins the LPG 1 with the highest priority. In one embodiment, the priority is determined based upon the LPG identifier. For example, in FIG. 1 there are two LPGs 1 and two GHs 25.

A node 10 within the LIA can be a candidate for a BN 20. However, there is no guarantee that a node 10 is within the LIA. Therefore edge heartbeats are used. An edge heartbeat is a heartbeat message with a HC, which is 1 hop larger than the effective HC limit. A node 10 cannot join the LPG 1 after receiving the edge heartbeat. Unlike a heartbeat message 200, an edge heartbeat is not relayed.

Figure 2:
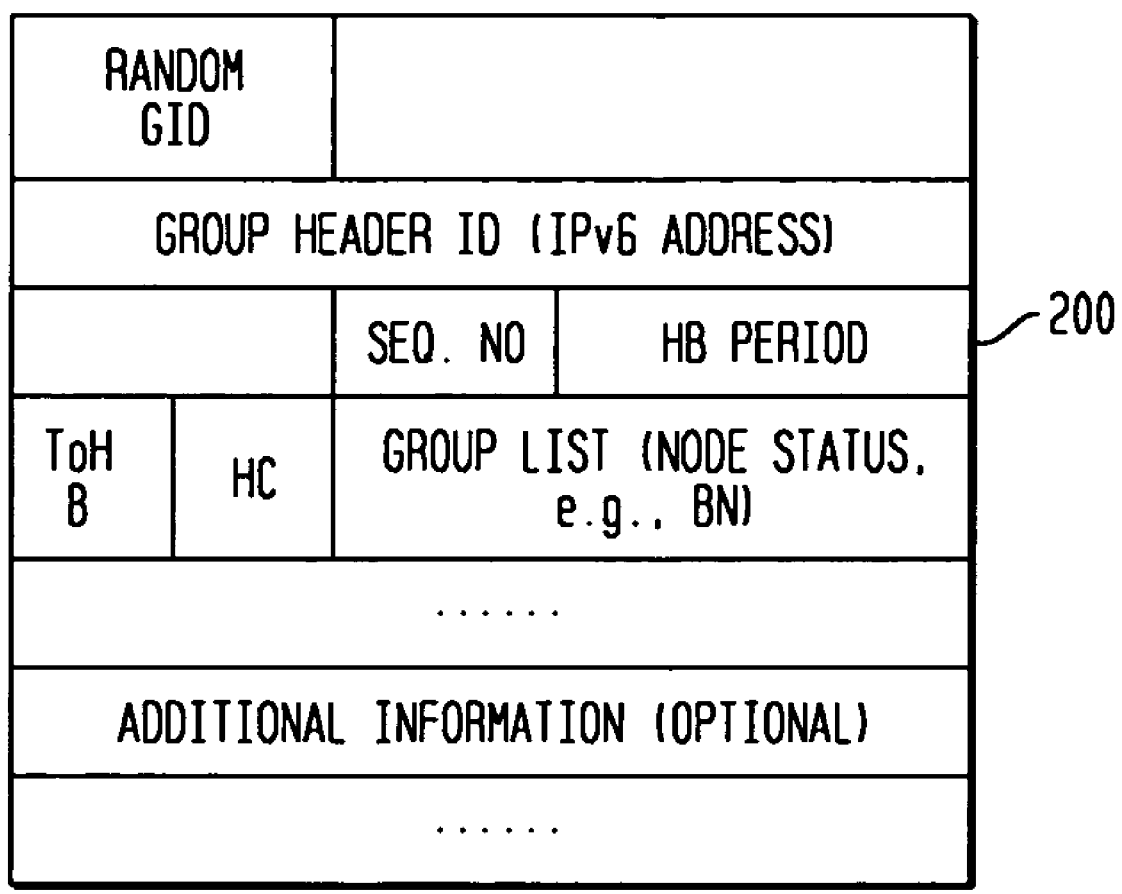
FIG. 2 illustrates an exemplary heartbeat message.

FIG. 2 illustrates an example of a heartbeat message 200 in accordance with the invention. The GH 25 periodically sends out a heartbeat message 200 identifying the LPG and providing information regarding the LPG. This period is a fixed interval (T). The value of the interval (T) is selectable based on design or operational needs. The GH 25 also maintains a list of all of the nodes in the LPG. This list includes a time stamp of when a node enters the LPG or when GH 25 receives a status update from the node 10. The list is used for various management and control functions for the LPG. For example, the list can be used to track group size, create and update the multicast routing table, and header resolution. Additionally, this list is periodically broadcast to all of the other nodes in the LPG 1. The LPG heartbeat message 200 is broadcast to all nodes within a radio vicinity of the GH 25.

The heartbeat message 200 will include the identifier of the LPG, the GH identification, a sequence number, and the type of heartbeat message, e.g., heartbeat with complete group list, incremental group list or no group list. In one embodiment, the heartbeat message will include a complete group list in every packet. Using a complete group list is the most accurate way to control routing and maintain a correct list of group members; however, there is a significant amount of bandwidth needed for the heartbeat message with a complete group. In another embodiment, every n-th heartbeat message 200 will include a complete group list. For example, each third heartbeat includes a complete group list. ToHb will indicate the type of heartbeat message 200. The type of heartbeat message is influenced by the topology change rate of the LPG 1 and frequency of broadcast of the heartbeat. As the topology change rate of an LPG 1 increases, there is a greater need for a complete group list being included in all heartbeat messages 200.

The heartbeat message 200 will include the hop count (HC) from the GH. Initially, the HC is set at a predetermined value, e.g., 1. Every time the heartbeat message 200 is relayed by a node, the relay node increases the HC value by 1, i.e., HC=HC+1. The HC value can be used to limit the LPG size, to indicate the staleness of the information within the heartbeat message 200 and to control routing of the control packets to reduce overhead as noted above. Once the HC is incremented to the maximum hop count, the control packet will not be relayed.

The usage of a maximum hop count, HC and Seq. No. prevents infinite duplications of control packets within the LPG 1. The hop count can also be used for a relay strategy. When a node forwards the heartbeat message it will include its ID information in the message so that next hop nodes know who relayed the heartbeat message 200.

As set forth above, a heartbeat message 200 can also include a Group List. A Group List can include information regarding the members of the LPG 1, such as the number of members in the LPG 1, IP addresses for each number, the hop count from the GH, status as a BN 20, a time-to live for the BN a classification.

A classification can be a code that references a relative direction from the GH, e.g., uplink, downlink, and peer. A peer classification indicates that a node is within the same wireless coverage area from the GH 25, i.e., all of the peer nodes have the same hop count from the GH. Upstream nodes are determined by the heartbeat. Downstream nodes are determined based upon a membership report (MR) 300 which will be explained later. Upstream transmission represents communication towards the GH 25 and downstream transmission represents communication away from the GH 25. This classification is a relative term. Each node can classify its neighbors into three different classes. If the membership report of another node has 1 less hop count (HC) than the HC of the node, the node is an upstream node. If the HC is the same with its own HC, the node is a peer. If the HC is 1 greater than its own HC, the node is a downstream node. The classification is used to select BN 20 from a group of BN candidates, one from each side of the GH 25.

Figure 3:
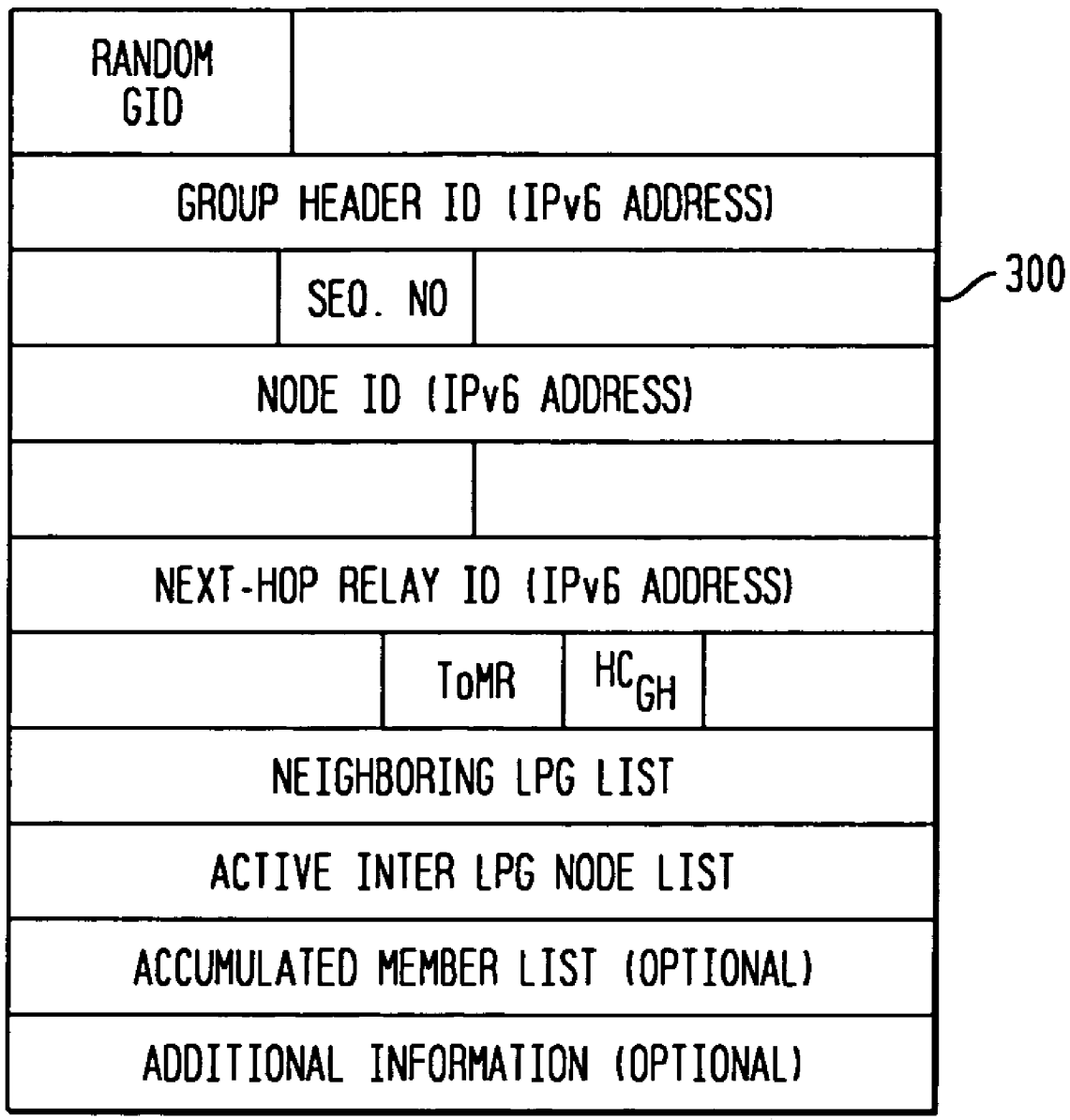
FIG. 3 illustrates an exemplary membership report message.

FIG. 3 illustrates an example of a membership report (MR) 300. An MR 300 is a control packet broadcast by a node other than a GH 25 and the recipient is the GH 25. The MR 300 is generated in response to a heartbeat message 200. The MR 300 includes collectable routing information such as a membership list, downstream node identifications, and next hop for downstream nodes. An MR 300 includes some of the same information as the heartbeat message 200: the GID and the Group Header Id. The MR 300 will also include an MR Seq. No. The MR Seq. No. is similar to the Seq. No for the heartbeat message 200 and is used to maintain order of the MR's. The MR. Seq. No. is the MR order for one particular node. Typically, the MR Seq. No. has the same value with the Seq. No. of the heartbeat message 200 that triggered the MR 300.

The Node ID of the originating node is also included in the MR 300, i.e., node that generated the MR 300.

The MR 300 also includes a Next-hop relay ID. The Next-hop relay ID is relay instructions for the MR 300 towards the GH 25. The next hop information is determined directly from the received heartbeat message 200. When a node 10 receives a new or fresh heartbeat message 200, it recovers the previous relaying node's identification from the IP layer and MAC layer before any packet processing. The previous relaying node's identification is stored in memory and used as the Next-hop relay ID for the MR 300. When a node 10 forwards a heartbeat message 200, the node 10 includes its ID in the packet. The receiving next hop node will store this ID when the node receives a new or fresh heartbeat message 200, as the next hop relay ID to reach the GH 25. A new or fresh heartbeat message 200 has a newer sequence number with the lowest HC.

The MR 300 also includes a "Type of MR indicator" ToMR. There are two types of MRs 300: a single member and aggregated multiple member report. A single member MR only includes an MR 300 from the originating node. An aggregated multiple member report includes the MR 300 of more than one node 10. The aggregated report can be used to reduce the overhead and bandwidth needed for control packets. One MR 300 is sent containing multiple MRs.

Additionally, the MR 300 can include a Hop count from the GH ($HC_{GH}$). ($HC_{GH}$) is the HC value from the GH to the originating node of the MR 300. The MR 300 will include an available channel list for the reporting node. Additionally, the MR 300 will include its status or availability for relaying a multicast message, i.e., a forwarding node status. The MR will also include a nomination for a BN 20, i.e., a node 10 will declare itself a candidate for a BN 20 and notify the GH 25. The MR includes a neighboring LPG list and active inter LPG node list, if available.

Figure 4:
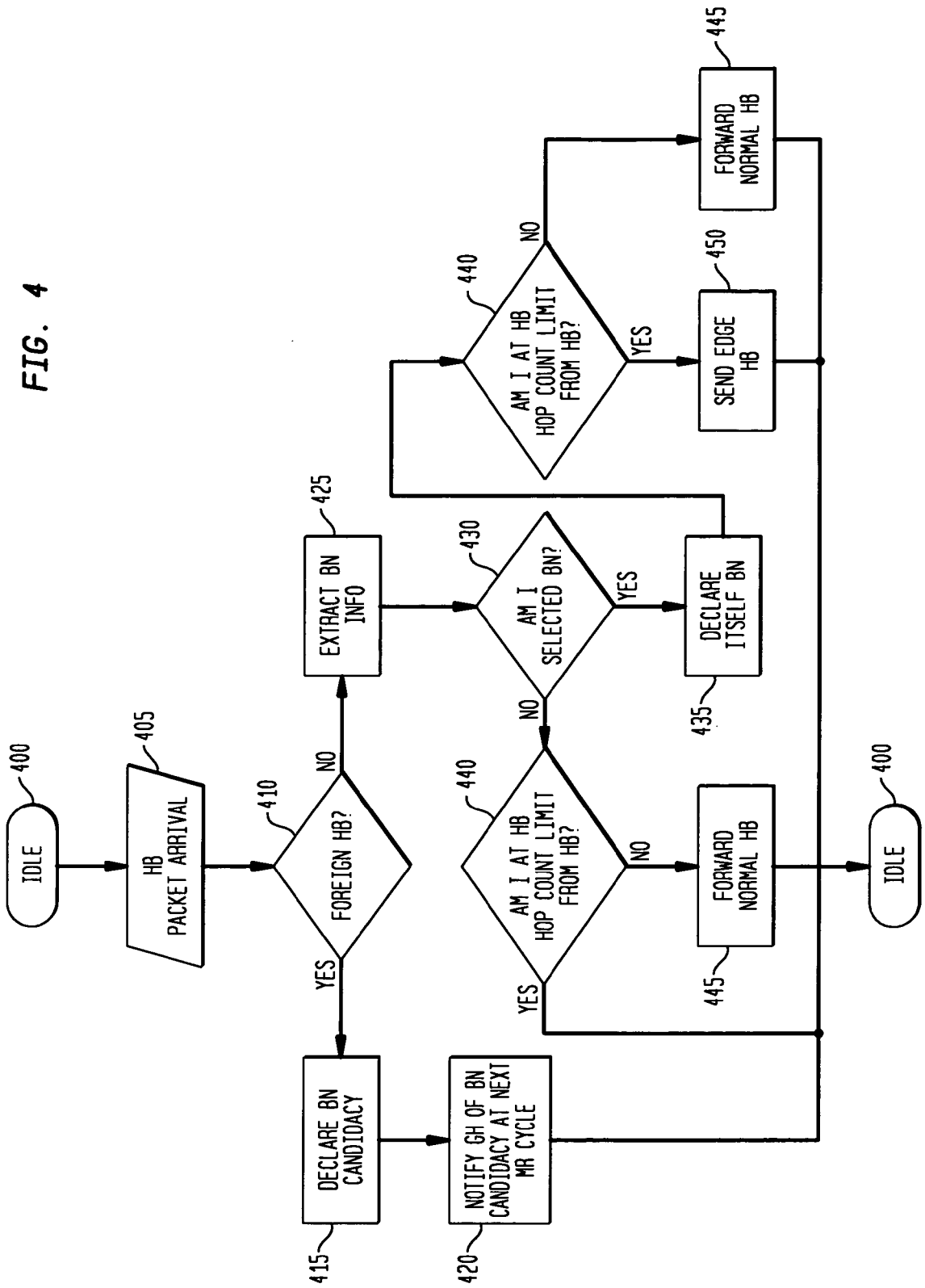
FIGS. 4 and 5 illustrate a flow diagram of a method for selecting a boundary node (BN) according to an embodiment of the invention.
Figure 5:
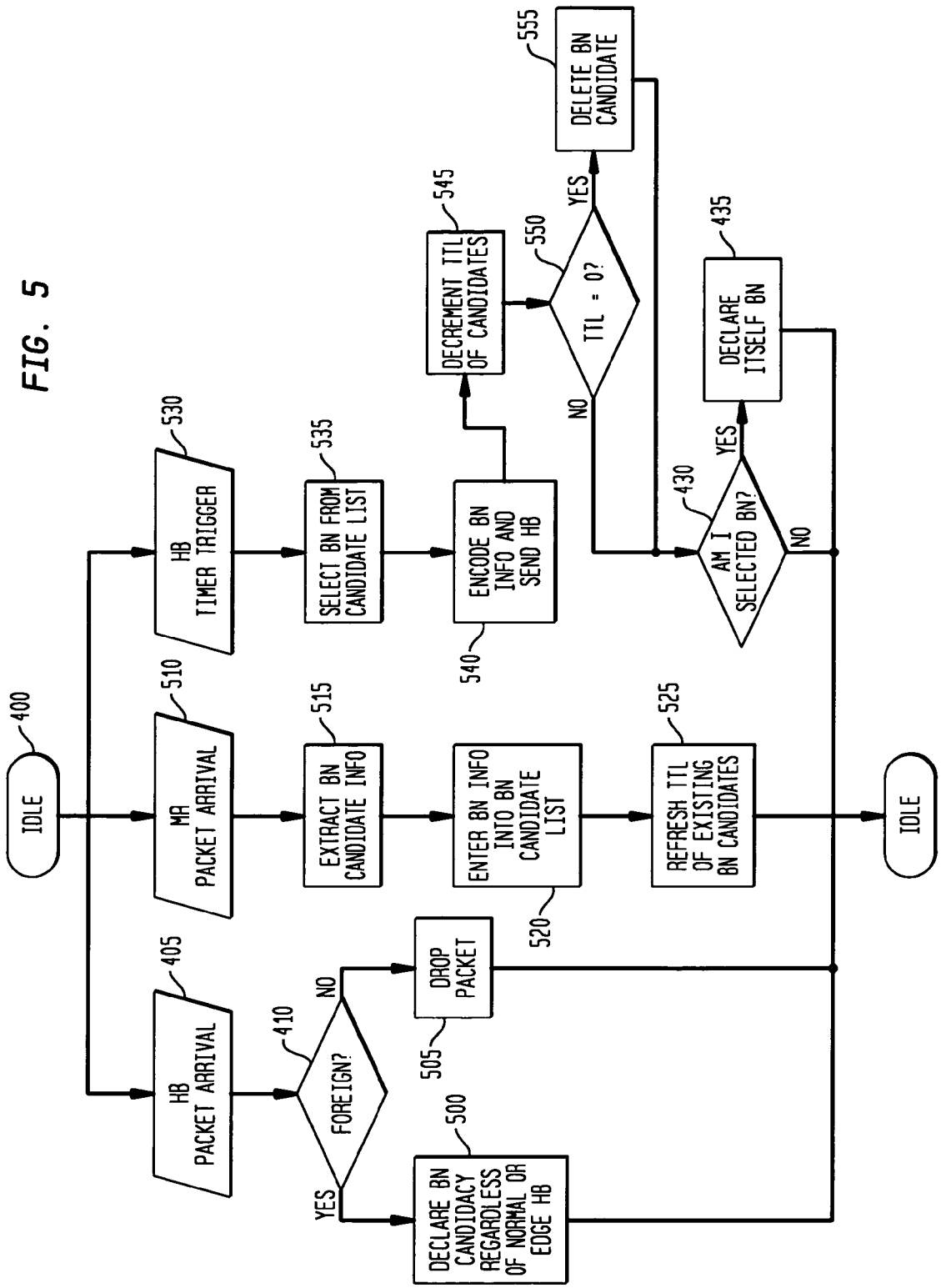

FIGS. 4 and 5 illustrate a method for selecting a BN according to an embodiment of the invention. FIG. 4 illustrates the functional blocks for all nodes that are not a GH 25. FIG. 5 illustrates the functional blocks of a node 10 that is a GH 25.

When a node 10 hears a foreign heartbeat, either heartbeat message 200 or edge heartbeat, the node 10 becomes a BN candidate. A foreign heartbeat is a message or packet that is not generated by a node 10 from the same LPG 1. Only a selected BN 20 broadcasts an edge heartbeat. If a BN 20 is at the edge of a LPG, the node 10 broadcasts the edge heartbeat. A BN 20 is at the edge of a LPG 1 if the node is at the heartbeat message hop count limit. An edge heartbeat is broadcast at an extra hop from the heartbeat message hop count allow the neighboring LPGs to notice the presence of another LPG 1. Foreign nodes, upon receiving the edge heartbeat do not join the LPG 1. The edge heartbeat is not forwarded.

At functional block 400, a non-GH node is idle. For purposes of the description a non-GH node will be referenced as a General Node (GN). At block 405, the heartbeat message 200 arrives. The heartbeat message 200 includes an identifier for the LPG. The GN determines that the packet is a heartbeat message 200 based upon the packet format. At block 410, the GN determines if the heartbeat message 200 is a foreign HB, e.g., a heartbeat message 200 from another LPG 1. The ON compares the LPG identifier contained in the heartbeat message 200 with the identifier of the LPG that the GN is in. If the identifiers are not the same, the GN declares itself as a BN candidate, at block 415. The GN changes its status to "BN candidate". The GH notifies the GH 25 of the BN candidacy using the MR 300. At block 420, the GN broadcasts a MR 300 to the OH during the next MR cycle. The MR includes a field for a nodes status, e.g., BN candidacy. Afterwards, the GN returns to an idle state, at block 400 and awaits the next heartbeat message 200 for a determination of the BN 20.

If, at block 410, the GN determines that the LPG identifiers are the same, the method proceeds to functional block 425. At block 425, the GN extracts any BN information included in the heartbeat message. The BN information includes the node identifier for the selected BN and any time-to-live value corresponding to the selected BN. The time-to-live value represents the period in which the selected BN acts as a boundary node. The time-to-live is expressed in heartbeat cycles.

At block 430, the GN determines if it is the selected BN. The GN compares the identifier of the selected BN contained in the heartbeat message 200 with its own node identifier. If the identifiers are the same, the GN declares itself as the BN 20 for the LPG, at block 435. The GN changes its status from BN candidate to BN 20. The GN notifies all members of the LPG that it is the BN 20 at the next MR cycle. The MR 300 will include the new status.

Afterwards, at block 440, the GN (now a BN 20), determines if the node 10 needs to forward the heartbeat message 200. Specifically, the BN 20 determined if the node 10 is located at the hop count limit for the heartbeat message 200. This determination is based on the hop count to GH contained in the heartbeat message 200 and maximum hop count for the heartbeat message 200. Each time a heartbeat message 200 is forwarded, the hop count to GH is incremented by 1. The hop count to the GH is compared with the maximum hop count. If the hop count to the GH is equal to the maximum hop count, the heartbeat message 200 is not forwarded or relayed. Instead, the BN 20 broadcasts an edge heartbeat, at block 450. The format of edge heartbeat is identical to heartbeat message 200. The only difference is the HC within every edge heartbeat is one greater than the maximum hop count that a heartbeat message 200 can carry. The BN 20 will then return to an idle state at block 400.

If the hop count to the GH is less than the maximum hop count, the heartbeat message 200 is forwarded or relayed, at block 445.

If at block 430, the identifier for the selected BN 20 does not match the identifier of the GN, the process moves to block 440 and the ON performs the normal heartbeat message 200 relay function. At block 440, the GN determines if the node 10 needs to forward the heartbeat message 200. The hop count to the GH is compared with the maximum hop count. If the hop count to the GH is equal to the maximum hop count, the heartbeat message 200 is not forwarded or relayed. The GN then becomes idle at block 400. If the hop count to the GH is less than the maximum hop count, the heartbeat message 200 is forwarded or relayed, at block 445. The hop count to GH is incremented by 1.

The BN selection process will now be described with respect to the GH 25. At block 400, the GH 25 is idle. At block 405, the heartbeat message 200 arrives. The heartbeat message 200 includes an identifier for the LPG. The GH 25 determines that the packet is a heartbeat message 200 based upon the packet format. At block 410, the GH 25 determines if the heartbeat message 200 is a foreign HB, e.g., a heartbeat message 200 from another LPG 1. The GH 25 compares the LPG identifier contained in the heartbeat message 200 with the identifier of the LPG that the GH 25 controls. If the identifiers are not the same, the GH 25 declares itself as a BN candidate, at block 500. The GH will declare itself a candidate regardless whether the heartbeat is an edge heartbeat or a heart message 200. The GH 25 changes its status to "BN candidate". If the LPG identifier contained in the heartbeat message 200 is the same as its own LPG identifier, then the heartbeat message 200 is ignored, for the purposes of BN selection, at block 505.

If a MR 300 arrives, the process starts at block 510. At block 515, the GH 25 extracts the BN candidate information from the MR 300. The GH 25 examines the status field in the MR 300 for a BN candidate. If the status field indicates that a node 10 is a BN candidate, the GH 25 records, the identifier for the node (GN) in a candidate list, at block 520. The GH 25 maintains a candidate list of all potential candidates. The GH 25 uses this list to select at least one BN 20.

At block 525, the GH 25 adjusts and refreshes the Time-to-Live (TTL) value for the existing BN 25 and BN candidates. If GH 25 receives an MR 300 from BN 20 without BN candidacy, GH 25 replaces BN 20 immediately by electing a new BN 20 among BN candidates. If GH 25 receives and MR 300 from BN 20 with BN candidacy, GH 25 reset the TTL. If GH 25 does not receive an MR 300 in a heartbeat interval, GH 25 reduces TTL value. When TTL value goes to 0, GH 25 re-elects a BN 20. Afterwards, the GH 25 becomes idle at block 400.

As described above, the GH 25 periodically broadcasts a heartbeat message 200. The period is known as the heartbeat interval. A timer within the GH 25 keeps track of the timing for the heartbeat interval. When time for the heartbeat interval expires, the timer triggers the generation of the heartbeat message 200, at block 530. Prior for broadcasting the heartbeat message 200, the GH 25 selects the BN 20 from the BN candidate list. In one embodiment, the selection criterion is the number of hops from the GH. The GH 25 selects the node 10 (GN) that is the greatest number of hop counts from the GH. The BN candidate list will then include the hop count information.

In another embodiment, the selection criterion is a time period in which the node 10 has been a member of the LPG 1. In this embodiment, GH 25 maintains a duration history for each node 10. The duration history is measured in terms of the number of heartbeat cycles. The GH 25 selects the longest affiliated node 10 from the BN candidate list as the BN 20.

In another embodiment, the selection criterion is a number of foreign heartbeats that the BN candidate received within a given time. In this embodiment, the nodes 10 (GN) track the sequence number for the foreign heartbeats, as well as the LPG identifier for the foreign heartbeat. The MR 300 broadcast towards the GH 25 will include the status as a BN candidate, the number of foreign heartbeat overheard, the identifier corresponding to the foreign heartbeat and the sequence number of each foreign heartbeat. The GH 25 extracts this information from the MR 300 as added it to the BN candidate list. The GH 25 selects the node 10 that overhears the greatest number of foreign heartbeat messages 200 having the same sequence number as the BN 20.

In another embodiment, the selection criterion is a relative mobility of the BN candidates with respect to the GH 25. In this embodiment, the nodes monitor their average speed. The average speed can be determined based upon input from an external velocity or speed measuring device. The speed information is added to the MR 300 and released to the GH 25. The GH compares each BN candidate's average speed with its own average speed. The smaller the difference in the average speeds, the higher the priority for the EN candidate.

In another embodiment, two BNs 20 are selected from the BN candidate list: one in each relative direction from the GH 25. The relative direction of the BN candidates is determined based upon the node's classification, e.g., upstream or downstream.

After the BN(s) 20 is/are selected, the BN information is appended to the heartbeat message 200. At block 540, the GH 25 broadcasts the heartbeat message 200. After the heartbeat message 200 is broadcast, the GH 25 decrements the TTL value for all BN candidates in the BN candidate list. The TTL value is decreased by 1. Each time a BN 20 reports to the GH 25, i.e., sends a MR 300 with its status as a BN 20, the TTL is refreshed to its original state, e.g., T heartbeat cycles.

The GH 25 then determines if the BN candidate is stale, at block 550. A BN candidate is stale if the TTL value equals zero. If the TTL value for a BN candidate is zero, the BN candidate is removed from the BN candidate list, at block 555. The determination is repeated for each BN candidate. Once the BN candidate list has been updated, GH 25 determines if the selected BN 20 with the GH 25, e.g. itself, at 430. The GH 25 compares the identifier of the selected BN contained in the heartbeat message 200 with its own node identifier. If the identifiers are the same, the GH 25 declares itself as the BN 20 for the LPG, at block 435. If the identifiers are not the same, the GH 25 becomes idle at block 400.

Figure 6:
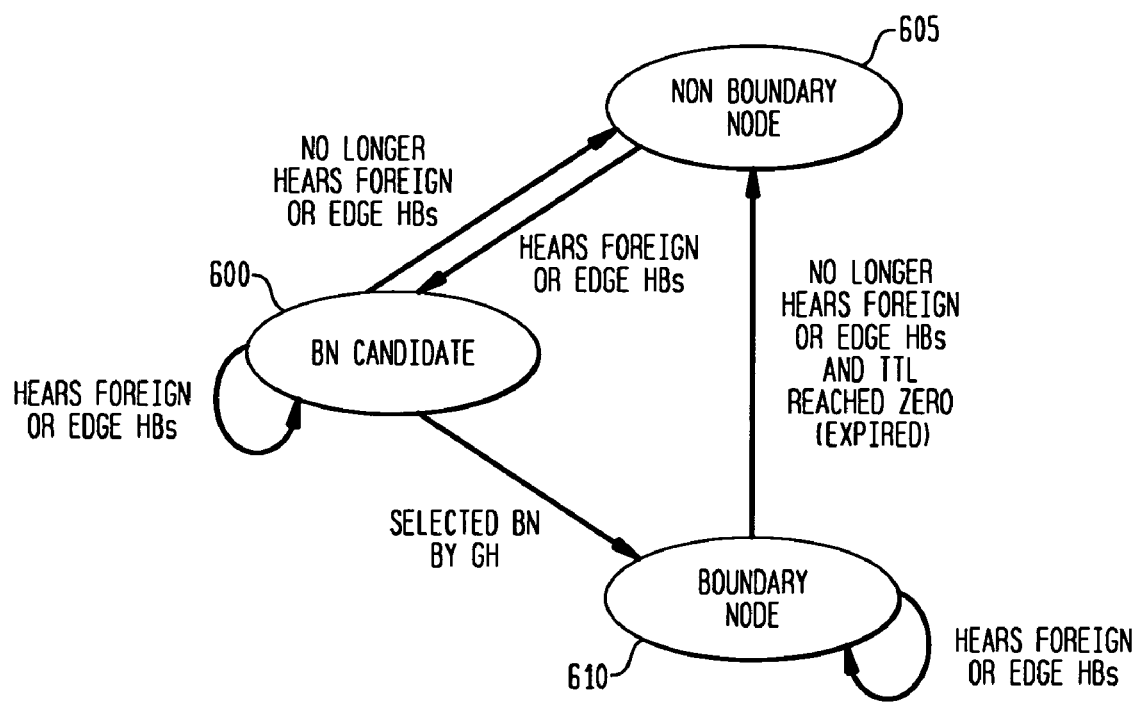
FIG. 6 illustrates a finite state diagram for the selection of BN according to an embodiment of the invention.

FIG. 6 illustrates a finite state machine for the selection of a BN 20. A node 10 can be in three different states: a BN candidate state 600, a non-BN state 605 and a BN state 610. A node 10 in a non-BN state 605 changes to a BN candidate state 600 if the node 10 receives a foreign heartbeat or an edge heartbeat. A node in a BN candidate state 600 changes to a BN state 610 when the GH 25 selects it as the BN 20. A node 10 remains in the BN candidate state 600 as long as the node 10 receives a foreign heartbeat or an edge heartbeat. A node 10 reverts back to a Non-BN state 605 from the BN candidate state 600 when the node 10 no longer receives the foreign heartbeat message or an edge heartbeat. A node 10 remains in the BN state 610 as long as the node 10 receives a foreign heartbeat or an edge heartbeat.

A node 10 reverts to a Non-BN state 605 from a BN state 610 when the node 10 no longer receives a foreign heartbeat or an edge heartbeat, or the TTL value is stale, i.e., TTL=0.

The BN 20 facilitates inter-LPG routing. The routing paths are determined based on routing tables within each node. The route table includes information regarding a next-hop for relaying the data, a next-LPG, and BN 20 for the LPG 1. The routing table is generated from information contained in the heartbeat message 200 and MR 300. Additionally, the routing table is updated with information overheard from foreign heartbeat and edge heartbeats.

Figure 7:
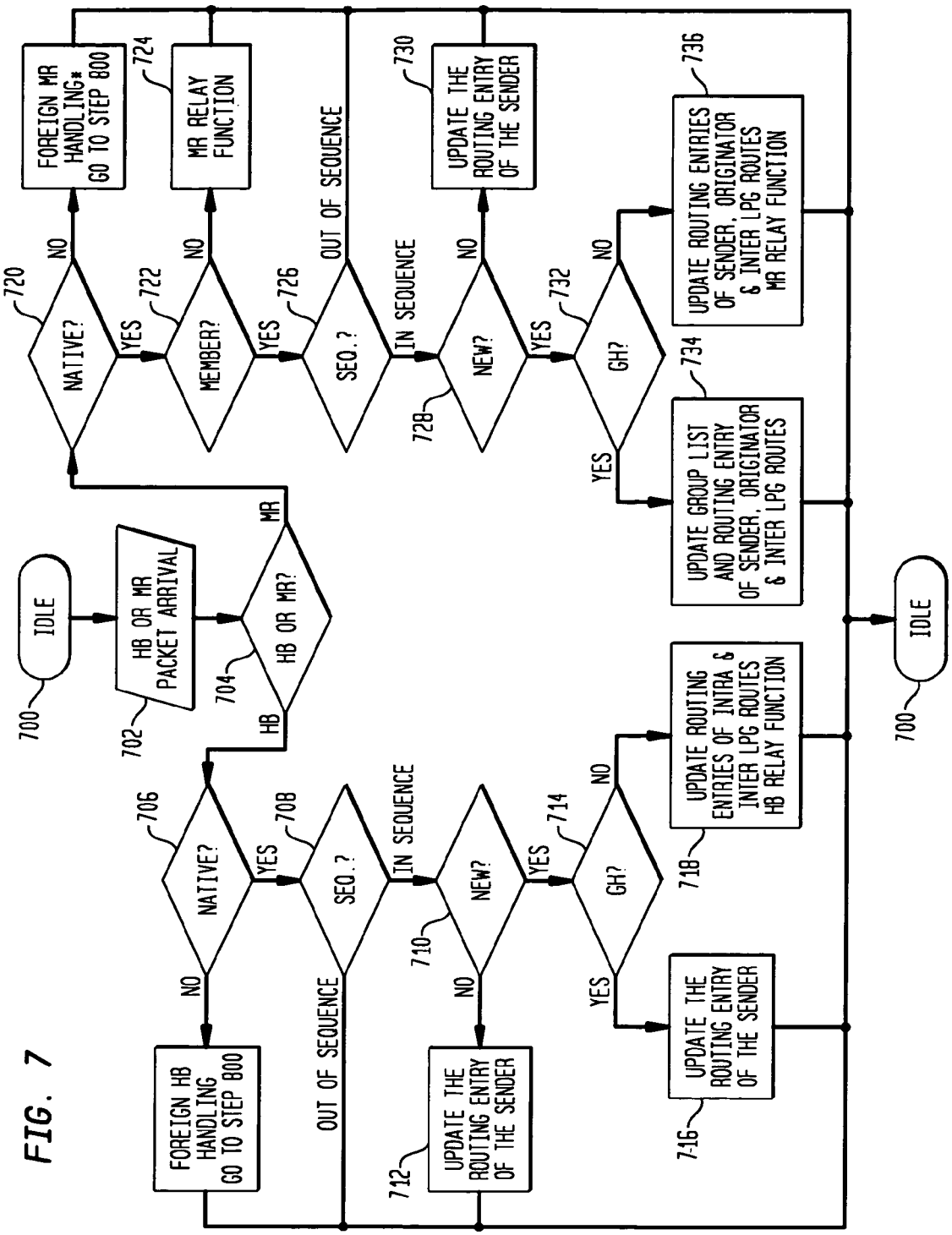
FIG. 7 illustrates a flow diagram for a method of creating a routing table and update entries in the routing table according to an embodiment of the invention.

FIG. 7 illustrates a method for processing the heartbeat message 200 and MR 300 to create and update the routing table. Initially, each node 10 is idle step 700. When a packet arrives, step 702, the node 10 determines whether the packet is a heartbeat message 200 or an MR 300, at step 704. Depending on the type of control packet, the node 10 performs special packet processing. If the control packet is a heartbeat message 200, the node 10 processes the packet starting with step 706. The node 10 determines if the packet is native, step 706. A packet is native if the packet is for the same LPG 1, i.e., the packet has the same GID (group identifier). The node 10 will compare the GID with the group identification stored in memory. If the GID does not match the identification stored in memory, the node 10 will initiate Foreign HB handling and go to step 800. Foreign HB handling will be described in detail in FIG. 8. If the GID matches the identification stored in memory, the node 10 will then determine if the heartbeat message 200 is in sequence, at step 708. The node 10 compares the Seq. No. with the sequence number in memory. If the Seq. No. is less than the value stored in memory, the node 10 ignores the packet. If the Seq. No. is greater than the value stored in memory, the heartbeat message 200 is in sequence and the node 10 determines if the heartbeat message 200 is new, at step 710 by comparing the current sequence number with the last stored sequence number. If the node 10 determines that the packet is not new, only the routing entry of the sender is updated, step 712. The heartbeat message 200 is not relayed. If the node determines that the message or data packet is new, then depending on whether the node is a GH 25 or GN, the node 10 will perform one of two functions. The determination of the node type is performed at step 714. If the node 10 is a GH 25, then the node 10 updates the routing entry of the sender, at step 716. The heartbeat message 200 is not relayed and the node will become idle 700. However, if the node 10 is a GN, then the node 10 updates the routing table for all intra and inter LPG routing entries and relay the heartbeat message 200, at step 718. The inter LPG routing information is obtained when a node 10 overhears a message from a foreign LPG or directly receiving the information from a BN 20. Additionally, inter LPG route information is include in the heartbeat message 200 from the GH 25. The node 10 adds to the routing table any new destinations, a next hop to the destinations and the identifier for the LPG that the new destination is in, and the BN 20 for the LPG 1. Additionally, the routing table includes a flag if the destination is an obligated destination. BNs 20 or GN with obligated foreign destinations use a flag and include the obligated destinations in their own MR 300 as foreign destinations. Upstream nodes including the GH 25 learn the foreign destinations by overhearing MR 300 from the BN 20 or GN with an obligated foreign destination. An obligated foreign destination will be described later The GH includes the foreign destination in the next heartbeat message 200 to inform the rest of the nodes 10 with the LPG 1. For destinations already listed in the routing table, the node 10 updates any information that is different from the information in the table. For example, the node 10 can update the next hop, LPG and BN 20.

If the control packet is an MR 300 the node 10 processes the packet starting with step 720. The node 10 determines if the packet is native, step 720. The node will compare the GID with the group identification stored in memory. If the GID does not match the identification stored in memory, the node 10 will initiate Foreign MR handling and go to step 800. If the GID matches the identification stored in memory, the node 10 determines if the node 10 that sent that MR 300 is a member of the LPG 1 (same LPG), at step 722. The node 10 compares the Node ID with a membership list stored in memory. If there is no match, then the node 10 only relays the MR 300, at step 724. The MR 300 is relayed so that a new group node (GN) can join the LPG 1 without having to wait for a complete heartbeat cycle.

If the node that sent the MR 300 is not listed in the join list, the node 10 is considered a joining node. There are no routing entries in the routing table for a joining node. In one embodiment, the node 10 can forward the MR 300 towards the GH 25. The node 10 will not update any entry in the routing table. In another embodiment, the node 10 can add the originating node (of the MR 300) to the destination list, i.e., reserve a routing entry for the originating node. The node 10 can save the relaying node information as the next hop and when the new heartbeat message 200 is received with the originating node as a member, the node 10 can automatically update the routing table with the information already stored in memory. When the new routing entry is finalized, the originating node can be classified as a downstream node.

If there is a match, then the node 10 determines if the MR 300 is in sequence, at step 726. The node 10 compares the MR Seq. No with the sequence number in memory. If the MR Seq. No is less than the value stored in memory, the node 10 ignores the packet and become idle 700. If the MR Seq. No is greater than or equal to the value stored in memory, the MR 300 is in sequence and the node 10 determines if the MR 300 is new, at step 728 by checking whether the node has already received the MR 300 from the originator with the current sequence number (by comparing with the last stored sequence number). If the node 10 determines that the message is not new, only the routing entry of the sender is updated, step 730. The MR 300 is not relayed. If the node 10 determines that the message is new, then depending on whether the node is a GH 25 or GN, the node 10 performs one of two functions. The determination of the node type is performed a step 732. If the node 10 is a GH 25, then the node 10 updates the routing entries of the immediate sender and originator, at step 734. If the MR 300 also carries at least one foreign destination, the node 10 adds the entries into a foreign destination list, at step 734. The collected foreign destination list is included in the next heartbeat message 200 to maintain inter LPG routes with the LPG 1. The update includes modifying both intra and inter LPG routes. If the MR 300 is from a node 10 having at least one obligated foreign destination, the receiving node 10 will update an inter LPG route, using the obligated foreign destination information. From the obligated foreign destination information, the receiving node 10 learns all foreign destinations (nodes) that can be reached from the node 10 that originated the MR 300. The next hop towards these foreign destinations is the node 10 that originated the MR 300. The update is described above and will not be described again in detail. The GH 25 also updates the membership list by adding any new destinations nodes into the membership list. The new membership list is included in the next heartbeat message 200. The MR 300 is not relayed and the node 10 will become idle 700.

However, if the node 10 is a GN, then the node 10 updates the routing table for sender and originator and relays the MR 300, at step 736. For example, for the originator, the next hop the originator is the direct sender. If the MR 300 also include a foreign destination list, foreign entries, the next hop towards the foreign destinations is the sender. The originator is a downstream node. The update includes modifying both intra and inter LPG routes. The update is described above and will not be described again in detail.

Figure 8:
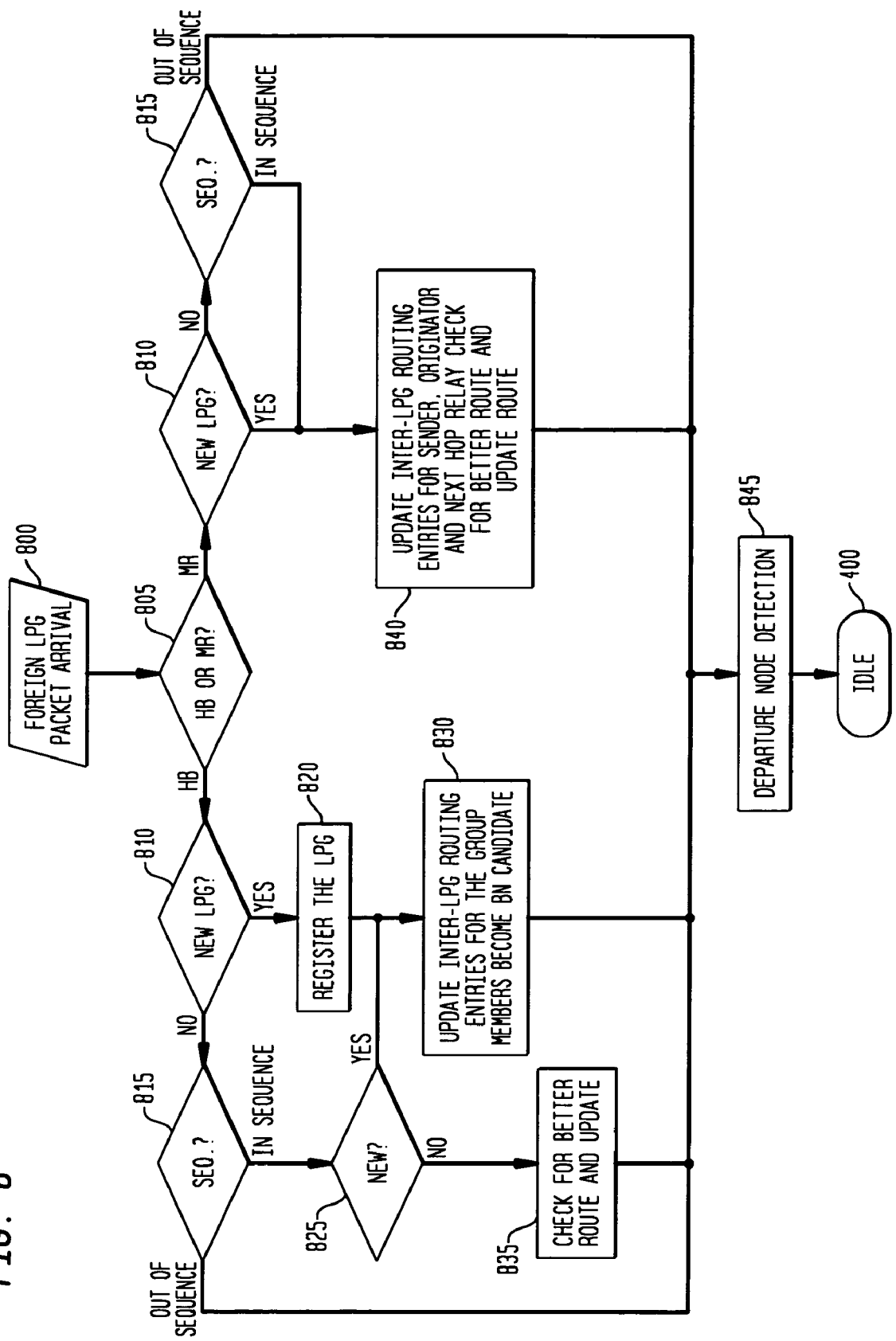
FIG. 8 illustrates a flow diagram for a method of processing a data packet received from a node in another local peer group.

FIG. 8 depicts a method for processing a foreign data packet or message. A foreign data packet or message is a message that originated from a node 10 in a different LPG. The determination of a foreign data packet is based upon the LPG identifier in the data packet. At step 800, a data packet is received from a foreign LPG. At step 805, the node 10 determines whether the foreign data packet is a heartbeat message 200 or an MR 300. Depending on the type of control packet, the node 10 performs special packet processing. At step 810, the node 10 determines if the data packet originated from a new LPG. This step is performed for both a heartbeat message 200 and an MR 300. The node 10 compares the LPG identifier in the foreign data packet with the LPG identifiers in the routing table. If the foreign data packet is not from a new LPG 1, the node 10 determines if the foreign data packet arrived in sequence, at step 815.

If the foreign data packet is from a new LPG and if the data packet is a heartbeat message 200, then the process moves to step 820. At step 820, the LPG 1 is registered. The LPG identifier is stored in memory and added to the routing table. A timestamp is also recorded. In an embodiment, the timestamp is used to purge the routing table of stale information. After the expiration of a predetermined period of time, the information is deleted from the routing table.

Additionally, the node 10 creates a new data structure for the new LPG, including information related to the new LPG such as LPG identifier, GH identifier, member list, and next top to the GH. This information is stored separate from the routing table. At step 830, the node 10 updates the inter LPG routing entries in the routing table. The routing entries are extracted from the membership list included in the heartbeat message 200. The node 10 adds each member from the membership list as a destination. For each destination, the routing table includes a next hop, the BN 20 and the LPG 1 the node is in. Additionally, the routing table includes a flag for an obligated foreign destination. An obligated foreign destination is a node 10 that is actively communication whose communication parties reside in the LPG or beyond the LPG 1. The node 10 also becomes a BN candidate since the node 10 overheard a foreign heartbeat message. In an embodiment, a foreign heartbeat counter is used to purge the routing table of stale information. After the expiration of a predetermined period of time, the information is deleted from the routing table. At step 830, the foreign heartbeat counter is reset each time a new foreign heartbeat is received.

If the heartbeat message 200 is not new, the node 10 determines if the data packet arrived in sequence, at step 815. The node 10 compares the Seq. No. with the sequence number in memory. If the Seq. No. is less than the value stored in memory, the node 10 ignores the packet and the foreign data packet is discarded. If the Seq. No. is greater than the value stored in memory, the heartbeat message 200 is in sequence and the node 10 determines if the heartbeat message 200 is new, at step 825 by comparing the current sequence number with the last stored sequence number. If the node 10 determines that the packet is not new, the node 10 determines if a better route is found at step 835. It is not always true that the fresh HB came through the shortest path. If the latter HB packet (even if it is not fresh) came through shorter path, the route to the GH should be updated. The routing table is updated based upon new information in the foreign heartbeat message 200. If the foreign data packet is determined to be new, at step 825, the process moves to step 830. Step 830 is described above and will not be described again in detail.

If the foreign data packet is a MR 300, the node 10 determined whether the LPG 1 is new or not at step 810. If the LPG 1 is new, the process proceeds to step 840. At step 840, the node 10 updates the inter LPG routing entries for the sender, originator and the next hop relay to the foreign GH in the routing table. The node updates the next hop information and destination information for the three types of nodes, e.g., sender, originator and next hop relay node. Additionally, the node 10 also checks for better routes. Better routes usually mean shorter hop routes. Even id those three foreign destinations, e.g., sender, originator and the next hop relay to the GH) are known by the BN 20, the GN has a direct path to the sender and a shorter path to the originator and the next hop relay. If the MR 300 is not new, the node 10 determines if the data packet arrived in sequence, at step 815. The node 10 compares the Seq. No. with the sequence number in memory. If the Seq. No. is less than the value stored in memory, the node 10 ignores the packet and the foreign data packet is discarded. If the Seq. No. is greater than the value stored in memory, the MR 300 is in sequence and the process moves to step 840. Step 840 is described above and will not be described again in detail.

After each of steps 830, 835 and 840, the process moves to step 845. At step 845, a departing node is detected. The detection process will be described in detail later.

Figure 9:
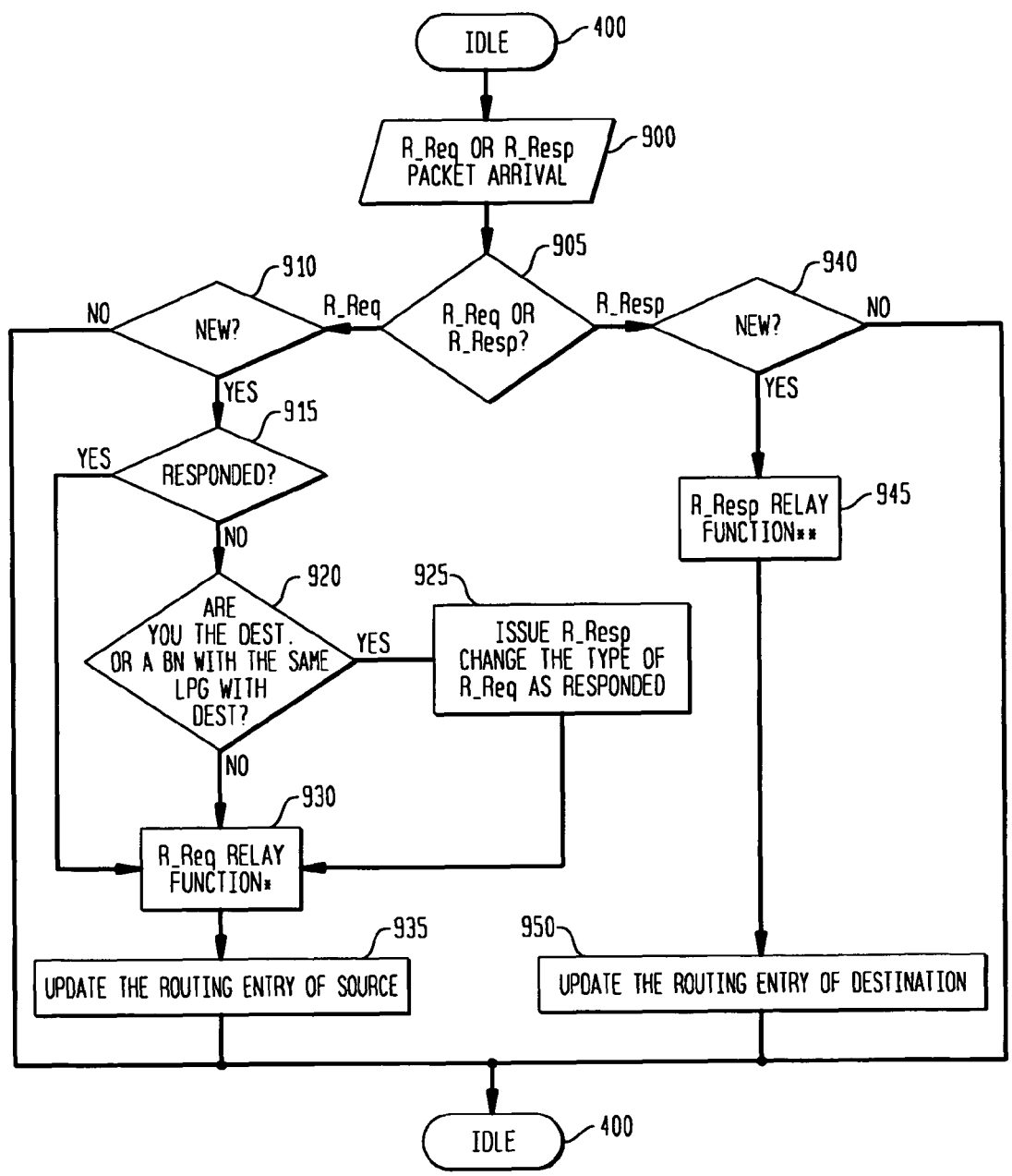
FIGS. 9-11 illustrate flow diagrams for an on-demand route discovery method according to an embodiment of the invention.
Figure 10:
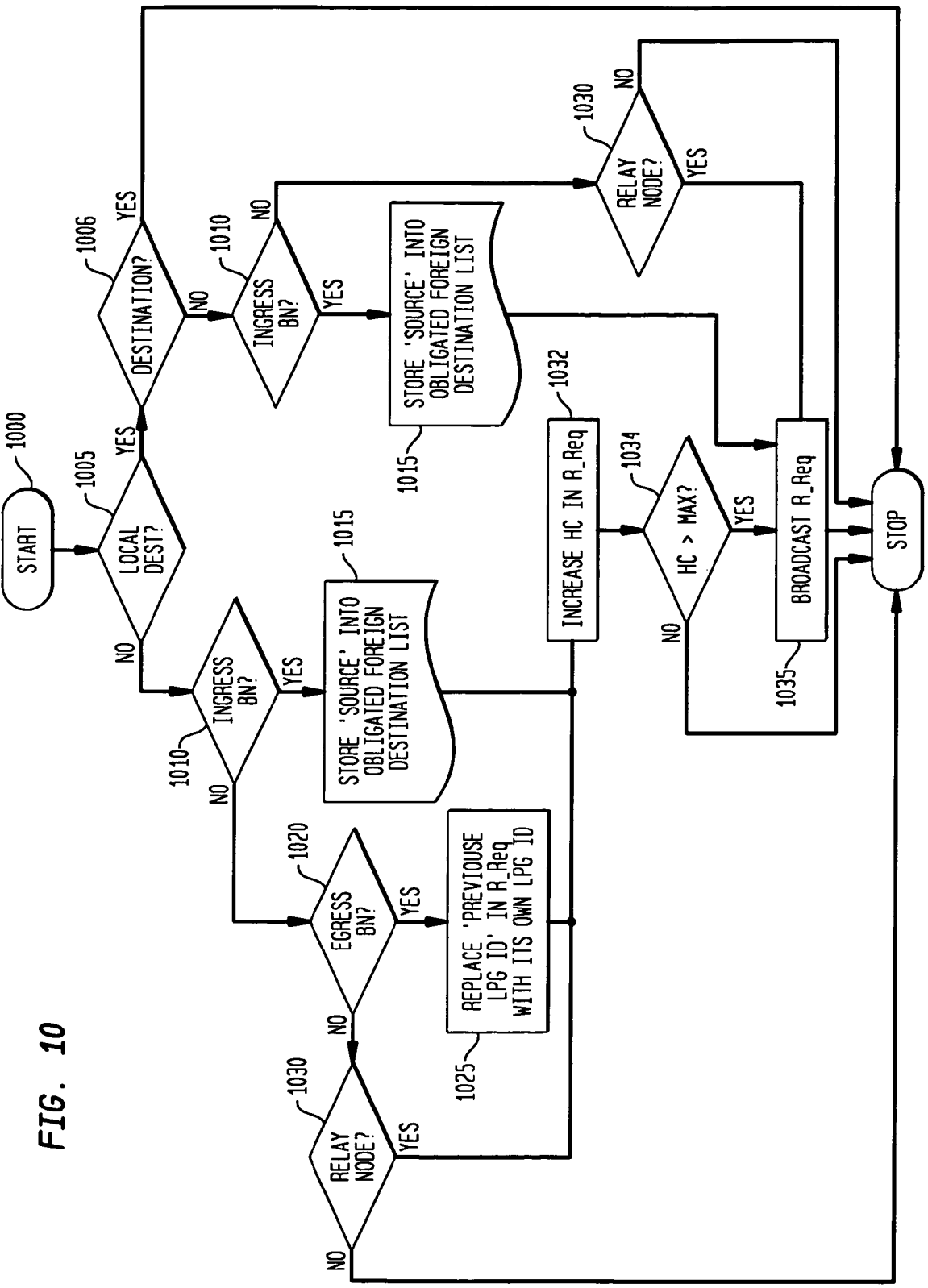
Figure 11:
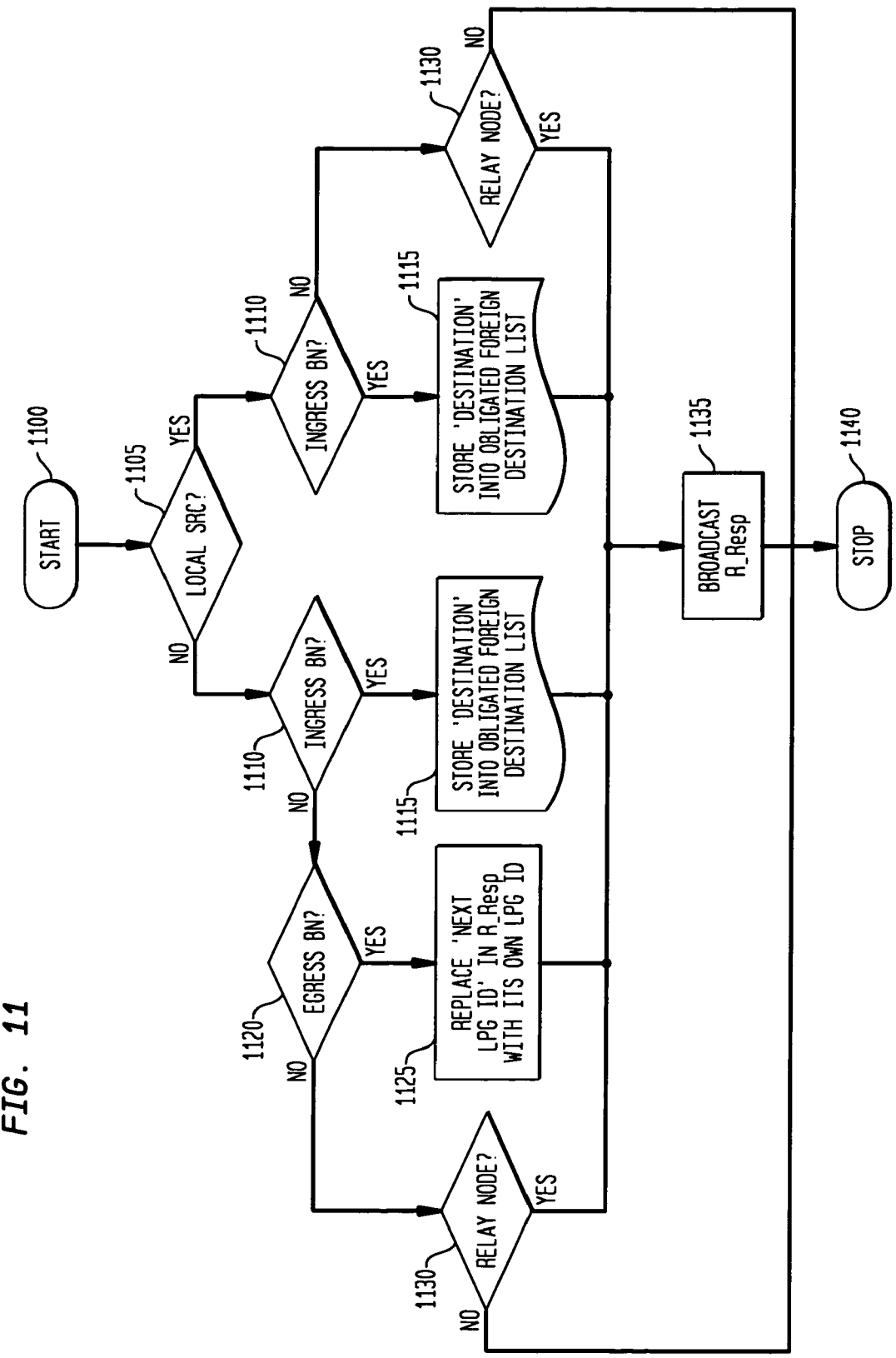

FIGS. 9-11 illustrate an on-demand route determining method. On-demand routes are determined and maintained using route request (R_Req) and route response (R_Resp) data packets. Routes for active communications are discovered and maintained. When a source needs to initiate a communication to a foreign destination, i.e., a destination in a different LPG 1, the node 10 sends a unicast R_Req message to a native BN 20. A native BN is a BN 20 in the same LPG 1. An R_Req is relayed by relay nodes. A relay node is a node 10 that has at least one downstream node is whose MR 300 is relayed by itself. The specific route is determined by next hop information in the routing table. An R_Resp is a message that is either initiated by the destination node or a BN 20 that is native to the destination node. An R_Req is relayed until the destination node is found or a maximum hop count is reached. The maximum hop count prevents an R_Req from being relayed infinitely in the wrong direction. Each time the R_Req is relayed the hop count is incremented by one. The R_Req is only relayed to the relay nodes and is not flooded.

If a BN 20 cannot issue an R_Resp, the BN 20 relays the R_Req towards a neighboring BN. The BN 20 forwards the R_Req to other BN 20 until the maximum hop count is reached or until a BN 20 can issue an R.Resp. When a BN 20 issues an R_Resp, the R_Resp indicates that the destination is in its neighboring LPG.

The R_Req includes a type of R_Req, a maximum hop count, a previous LPG identifier, a destination, a destination sequence number, a source identifier and a source sequence number. The type of R_Req can be normal, responded, etc. The type of R_Req is used to identify if the R_Req is responded to before it reached the destination, a destination node does not have to issue an R_Resp if the R_Req is already responded to before the R_Req reaches the destination node. As described above, the maximum hop count is used to limit the routing search. The previous LPG identifier is the identifier for the immediate neighboring LPG 1 where the R_Req was most recently relayed if R_Req came from another LPG. The previous LPG identifier is equal to the current LPG identifier in the LPG 1 where the source node belongs. The destination ID is the identifier for the destination node. The source ID is the identifier for the source node. The source sequence number is used to uniquely identify each R_Req data packet and order the R_Reqs. In another embodiment, the R_Req additionally includes a target BN identifier, a next hop identifier towards the target BN and a previous hop. The target BN identifier allows a node 10 distinguish between BNs 20 in the same LPG 1. If there are more than one BN 20 in a LPG 1, a node 10 will know which direction to relay the R_Req. The next hop identifier towards the target BN is used by relay nodes to relay the R_Req towards the target BN. Only the next hop forwards the R_Req. Nodes 10 for a reverse path use the previous hop. R_Resp is relayed back to the source based on the routing tables of the intermediate nodes. The source is inserted in the routing table when the R_Req is forwarded, and the routing entry is maintained within each LPG by nodes who have the source node as their obligated foreign destination. An advantage of included the previous hop is that if the R_Resp travels through multiple LPGs; the intermediate LPGs 1 might not have the source node in the routing table. Intermediate LPGs are LPGs which are in between the source LPG and the destination LPG. All the nodes including the source LPG, intermediate LPG and the destination LPG have routing information of the source and the destination. The previous hop is extracted from the R_Req and stored in memory for later use.

The R_Resp includes a hop count, a next LPG identifier, a destination identifier, a destination sequence number, a source identifier, a source sequence number and a next hop relay. A hop count is the number of hops the destination node is away from the source node. The next LPG identifier is the identifier for the next LPG where the R_Resp is going to be relayed.

As depicted in FIG. 9, the node 10 is idle at step 400. At step 900, an R_Req or R_Resp arrives. At step 905, the node 10 determines whether the received data packet is a R_Req or an R_Resp. This determination is based upon the format of the arriving data packet and information contained therein.

If the arriving data packet is an R_Req, the process moves to step 910. At step 910, the node 10 determines if the R_Req is a new request. The determination is based upon the sequence number of the data packet, i.e., source sequence number. Each time a R_Req packet is received, the source sequence number is extracted from the packet and stored in memory. When a new R_Req packet arrives, the last stored source sequence number is compared with the source sequence number for the arriving R_Req packet. If the source sequence number is less than the value stored in memory, the node 10 ignores the packet and the packet is discarded. If the source sequence number is greater than the value stored in memory, the R_Req is new and the node 10 determines if the R_Req a response to the R_Req has already been issued, at step 915. The determination is based upon the type of R_Req indicator included in the R_Req. If the type of R_Req indicates that a response to the R_Req has already been issued then the node 10 relays the R_Req to the destination at step 930. When the R_Req has not been responded, the node 10 determines if it is a BN 20 in the destination's LPG or the destination at step 920.

If the node 10 is either a BN 20 in the destination's LPG or the destination, the node 10 issues R_Resp and change the type of R_Req as "Responded" at step 925. Afterward, the node performs the R_Req Relay Function at step 930. R_Req Relay Function is described below. After the R_Req relay function is performed, the node 10 updating the routing for the source of the R_Req, i.e., the next hop of the source is where the R_Req packet came from at step 935.

If the type of R_Req indicates that a response to the R_Req has not been issued then the node 10, determines if it can issue a response, at step 920. Only a destination node or a BN 20 can issue a R_Req. The node 10 extracts the destination identifier from the R_Req and compares the identifier with its own. If the identifiers match, then the node 10 is the destination node. If the identifiers do not match, then the node 10 is not the destination node. Additionally, using the destination identifier, the node 10 looks up the BNs 20 for the destination node in the routing table. The node 10 compares the identifier for the BNs 20 with its own. If the identifiers match, then the node 10 is a BN 20 for the destination node. If the identifiers do not match, then the node 10 is not a BN 20 for the destination node, i.e., not a BN in the LPG 1 where the destination node resides.

If the node 10 is either the destination node or a BN 20 in the destination node's LPG 1, the BN 20 or the node 10 issues an R_Resp, at step 925. Additionally, the node 10 changes the type of R_Req to Responded and the R_Req is relayed to the destination at step 930.

If the node 10 is not the destination node or a BN 20 for the destination node (at step 920), then the node 10 relays the R_Req towards the BN 20 or destination node, at step 930. The source node becomes an obligated foreign destination for the BN 20 and the BN 20 is the ingress BN of the source node. The R_Req relay function is described in FIG. 10 and will be described in detail later.

At step 935, the node 10 updates routing information for the source node in the routing table with information from the R_Req. For example, the node 10 can add the source node identifier, LPG information for the source node and hop count for the source node.

If the arriving data packet is an R_Resp, the process moves to step 940. At step 940, the node 10 determines if the R_Resp is a new response. The determination is based upon the sequence number of the data packet, i.e., destination sequence number. Each time a data packet is received, the destination sequence number is extracted from the packet and stored in memory. When a new data packet arrives, the last stored destination sequence number is compared with the destination sequence number for the arriving data packet. If the destination sequence number is less than the value stored in memory, the node 10 ignores the packet and the packet is discarded. If the destination sequence number is greater than the value stored in memory, the R_Resp is new, and the R_Resp is relayed towards the source node at step 945.

The R_Resp relay function is described in FIG. 11 and will be described in detail later.

At step 950, the node 10 updates routing information for the destination node in the routing table with information from the R_Resp. For example, the node 10 can add the destination node identifier, LPG information for the destination node and hop count for the destination node.

FIG. 10 describes the relay process for the R_Req. The process starts at step 1000. At step 1005, a node 10 determines if the destination node is within the same LPG 1, i.e., a local destination. The node 10 looks in the routing table and checks whether the destination node is an intra-LPG destination. If the destination node is listed as an intra-LPG routing entry, the destination is in the same LPG. If the destination is local, i.e., intra-LPG, the node 10 determines if the R-Req has reached the destination node, i.e., identifier for the destination node is the same as the current node's identifier. The destination node will terminate the R_Req forwarding upon received of an R_Req destinated to itself.

Steps 1010, 1015 1030 and 1035 are performed for both local and non-local destinations. At step 1010, a node 10 determines if the node 10 is the ingress BN for the source. Ingress BN is a BN 20 that receives a R_Req from a node 10 in another LPG 1 for the first time among nodes 10 in an LPG 1 or the source of R_Req is already in its obligated foreign destination list. Obligated foreign destinations are special routing entries for nodes outside of its LPG. When a node has obligated foreign destinations, the node IDs of obligated foreign desinations are included as a part of its MR (Member report) to inform that those nodes can be reached through the node. A relay node is a node which relays at least one MR 300 of a downstream node to the upstream node in "k" previous control message cycles.

If the node 10 is an ingress BN of the source, then the node 10 inserts updates the routing table with an entry for the source node, at step 1015. The source node becomes an obligated foreign destination. The node set the obligation flag. The node (ingress BN) is responsible for informing or advertising the routing information to its own LPG 1.

After the node 10 updates the routing table, the node 10 (ingress BN) broadcasts, the R_Req at step 1035. Prior to broadcast, the node 10 increments the hop count by 1, at step 1032. Additionally, the node 10 determines if the maximum hop count for the R_Req has been reached, at step 1034. The maximum hop count is included in the R_Req. The node 10 compares the maximum hop count with the current hop count, e.g., the hop count of the received R_Req+1. If the maximum hop count has been reaches, the R_Req is not forwarded and the node 10 stops at step 1040.

If the destination node is local and the node 10 is not an ingress BN, the node 10 determines if the node 10 is relay node, at step 1030. The next-hop relay is based on information in the routing table. If the node 10 is a relay node, the R_Req is broadcast at step 1035. The process is then ended at step 1040. Prior to broadcast, the relay node increments the hop count by 1, at step 1032. Additionally, the relay node determines if the maximum hop count for the R_Req has been reached, at step 1034. The maximum hop count is included in the R_Req. The relay node compares the maximum hop count with the current hop count, e.g., the hop count of the received R_Req+1. If the maximum hop count has been reaches, the R_Req is not forwarded and the relay node stops at step 1040.

If the destination node is a non-local destination and the node 10 is not an ingress BN, the node 10 determines if the node 10 is an egress BN. An egress BN is a BN that receives a R_Req from a node 10 in its own LPG or the sources of the R_Req is already in its foreign destination (it is not an obligated one though.) An egress BN function is to broadcast the R_Req to a neighboring LPG so the LPG can receive the R_Req. If the node 10 is an egress BN, the node 10 replaces the Previous LPG identifier with its own LPG identifier, at step 1025 and broadcasts the R_Req at step 1035. When hopcount reaches to the maximum hop count, the R_Req is not re-broadcasted any more.

If the destination node is a non-local and the node 10 is not an ingress BN or an egress BN, the node 10 determines if the node 10 is relay node, at step 1030.

The next hop relay is based on information in the routing table. A relay node is a node 10 that has at least one downstream node who's MR 300 is relayed by it. If the node 10 is not a relay node, then R_Req is not relayed or forwarded. If the node 10 is a relay node, the R_Req is broadcast at step 1035. The process is then ended at step 1040.

FIG. 11 describes the relay process for the R_Resp. The process starts at step 1100. At step 1105, a node 10 determines if the source node is within the same LPG 1, i.e., a local source. The node 10 looks in the routing table and reads the LPG identifier for the LPG 1 of the source node. The LPG identifier for the source node is compares with the LPG identifier for the node 10. If the identifiers match, the source node is in the same LPG 1. The relay process is similar for both local and non-local destinations, except that for non-local destinations there are two extra steps.

Steps 1110, 1115 1130 and 1135 are performed for both local and non-local sources. At step 1110, a node 10 determines if the node 10 is an ingress BN for the destination when it receives a R_Resp from the node in another LPG. An ingress BN is a BN that receives a R_Resp from a node 10 in another LPG 1.

If the node 10 is an ingress BN, then the node 10 inserts updates the routing table with an entry for the destination node, at step 1115. The destination node becomes an obligated foreign destination. The node set the obligation flag. The node (ingress BN) is responsible for informing or advertising the routing information to its own LPG 1.

After the node 10 updates the routing table, the node 10 (ingress BN) broadcasts, the R_Resp at step 1135. In an embodiment, the R_Resp is relayed through the same path as the R_Req.

If the source node is local and the node 10 is not an ingress BN, the node 10 determines if the node 10 is relay node, at step 1130. The determination is based on information in the routing table. A relay node is a node that have at least one downstream node who's MR 300 is relayed by it. If the node 10 is not a relay node, then R_Resp is not relayed or forwarded. If the node 10 is a relay node, the R_Resp is broadcast at step 1135. The process is then ended at step 1140.

If the source node is a non-local source and the node 10 is not an ingress BN, the node 10 determines if the node 10 is an egress BN at step 1120. An egress BN function is to broadcast the R_Resp to a neighboring LPG so the LPG can receive the R_Resp. If the node 10 is an egress BN, the node 10 replaces the Next LPG identifier with its own LPG identifier, at step 1125 and broadcasts the R_Resp at step 1135.

If the source node is a non-local and the node 10 is not an ingress BN or an egress BN, the node 10 determines if the node 10 is relay node, at step 1130. The determination is based on information in the routing table. A relay node is a node that have at least one downstream node who's MR 300 is relayed by. If the node 10 is not a relay node, then R_Resp is not relayed or forwarded. If the node 10 is a relay node, the R_Resp is broadcast at step 1135. The process is then ended at step 1140.

Once the source node receives the R_Resp, the source node commences transmission of its message, data or communication to the destination node.

Figure 12:
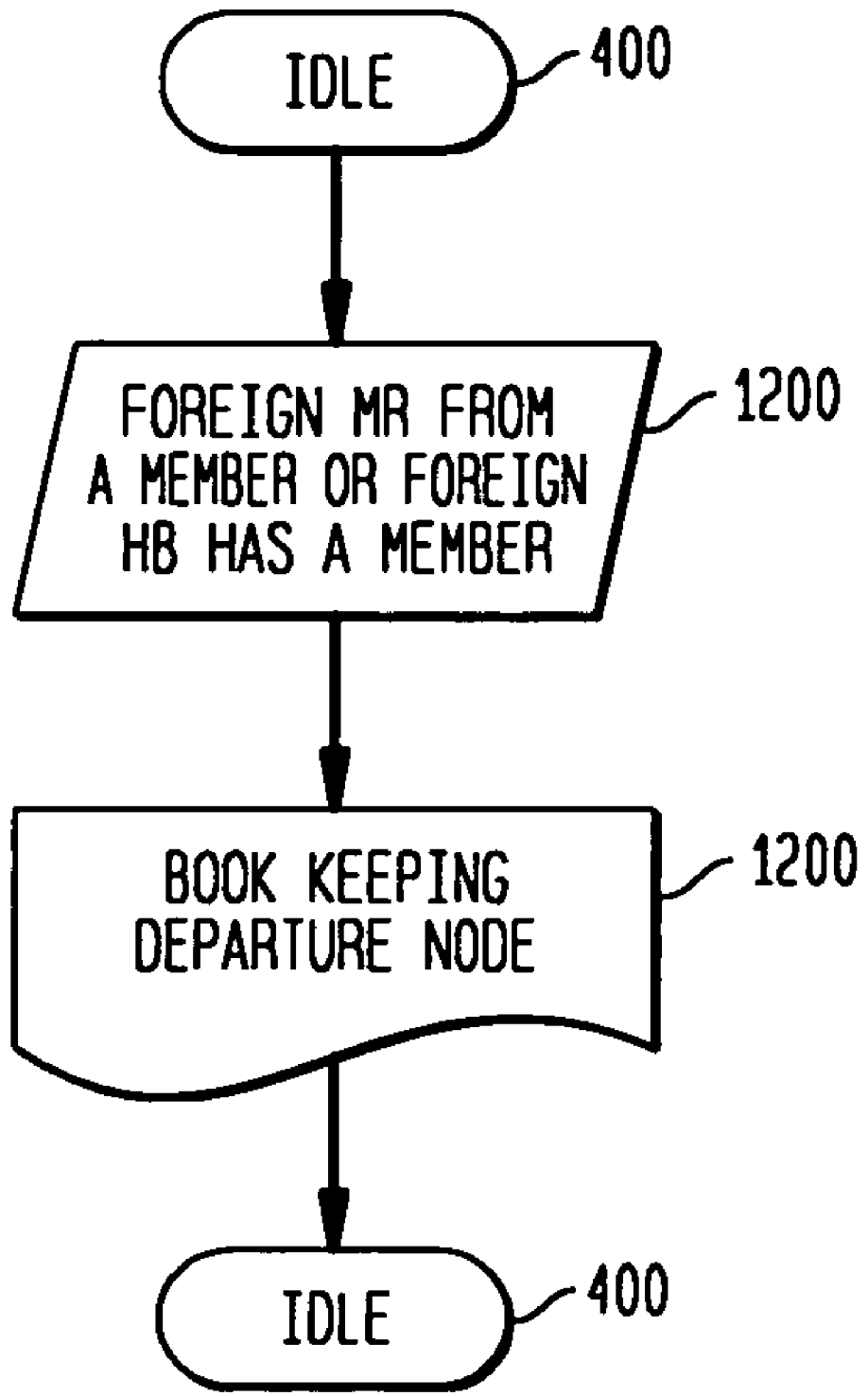
FIG. 12 illustrates a flow diagram for a mobility detection method according to an embodiment of the invention.
Figure 13:
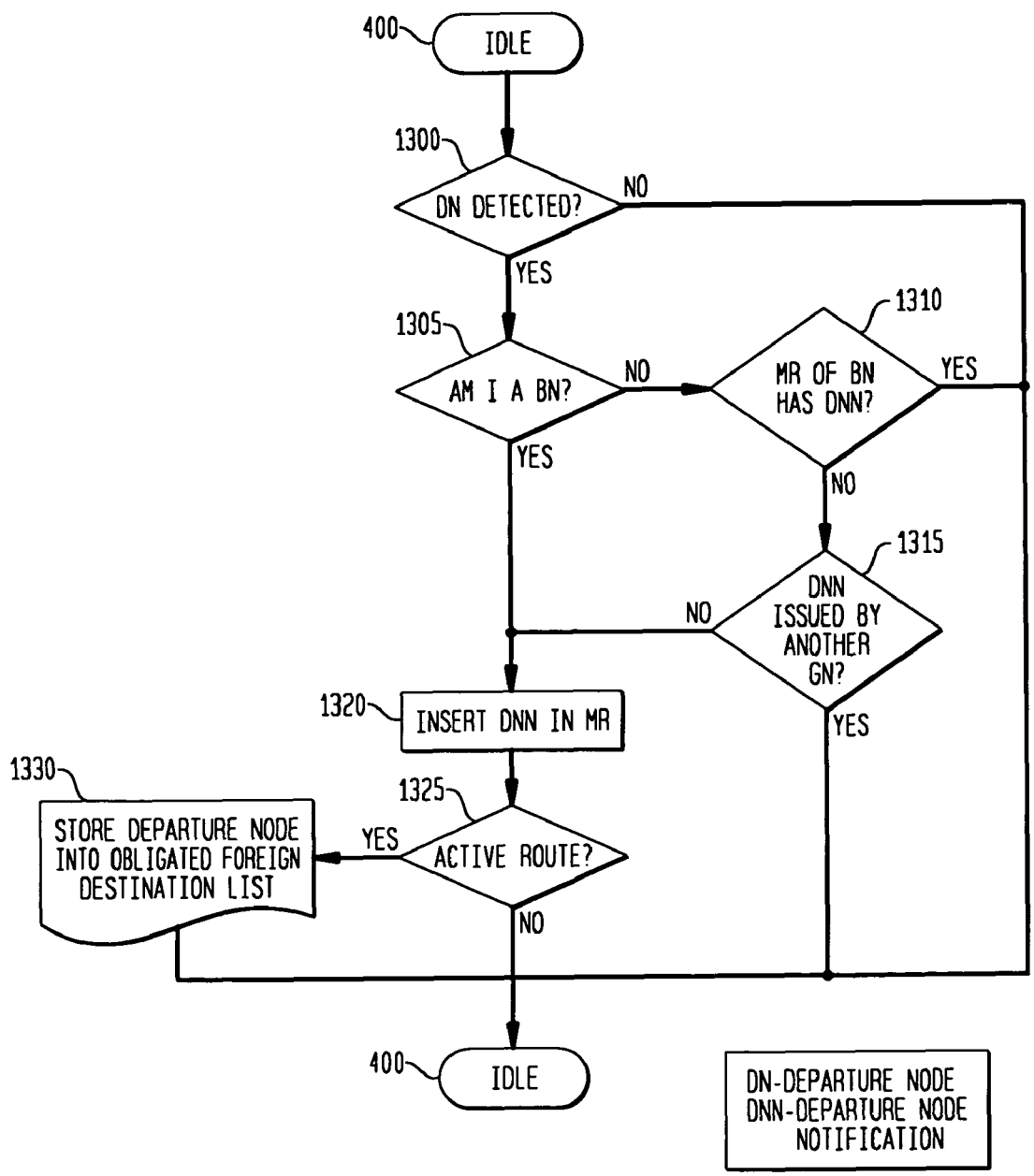
FIG. 13 illustrates a flow diagram for a method of notifying nodes of the detection of a departing node from an local peer group according to an embodiment of the invention.

As described above, the BN 20 is responsible for maintaining active communication paths and to notify other nodes 10 of moving or departing nodes. FIG. 12 illustrates a process of detecting a departing node. The process begins with a BN 20 being idle at step 400. A departing node is detected at step 1200. A departing node is detected in one of two manners. A departing node can be detected by overhearing a foreign heartbeat message 200. Specifically, a departing node will have its identifier included in a membership list contained in the heartbeat message 200. The BN 20 determines that a node has departed the LPG when a node that was in its own LPG 1 is listed in a foreign membership list. Alternatively, a departing node can be detected when the departing node broadcasts a MR 300 with a identifier for a foreign LPG 1. The BN 20 overhears a MR 300 from a node that was previously in the same LPG. The BN 20 compares its LPG identifier with the identifier in the MR 300. If the identifiers are different, the node 10 has departed. A node 10 can only be a member of one LPG 1.

At step 1205, the BN 20 updates its routing table for the departing node. Specifically, the BN 20 changes the LPG for the departing node. Once the routing table has been updated, the BN returns to an idle state at step 400. The BN then advertises information related to the departing node.

In another embodiment, any node (not just a BN 20) can detect a departing node by overhearing a foreign heartbeat or a foreign MR 300.

20. The BN information is retrieved from the routing table. If the node 10 is a BN 20, the BN 20 include a departing node notification in the next MR 300. The notification is a positive statement that a node has left the LPG 1. The notification includes the departing node's identifier and the identifier for the new LPG. The BN 20 then determines if an active communication is pending for the departing node, at step 1325. A communication is pending it the departing node is either a destination or source of a communication. If no active communication is pending, the BN 20 returns to an idle state (step 400). However, if an active communication is pending, the BN 20 must maintain the route. The route is maintained by updated the routing table by adding the departing node to a list of obligated foreign destination at step 1330. This list is broadcast in the next MR 300 and later included in a heartbeat message 200. The BN 20 then returns to an idle state (step 400).

If at step 1305, the node 10 is not a BN 20, the node 10 then determines if a BN 20 has already sent a departing node notification. The node 10 checks the latest received MR 300 from a BN 20 for a departing node notification, at step 1310. If the MR 300 contained a departing node notification, the node 10 returns to an idle state. The node 10 updates the routing table with information contained in the departing node notification.

If the MR 300 from a BN 20 did not include a departing node notification, the node 10 determines if another node has already sent a departing node notification. The node 10 checks the latest received MR 300 from any node for a departing node notification, at step 1315. If the MR 300 contained a departing node notification, the node 10 returns to an idle state.

If no departing node notification was received from any node 10, the process moves to step 1320, where the node 10 inserts a departing node notification in its MR 300. The node 10 then performs steps 1325 and 1330 (as if it was a BN 20).

Figure 14:
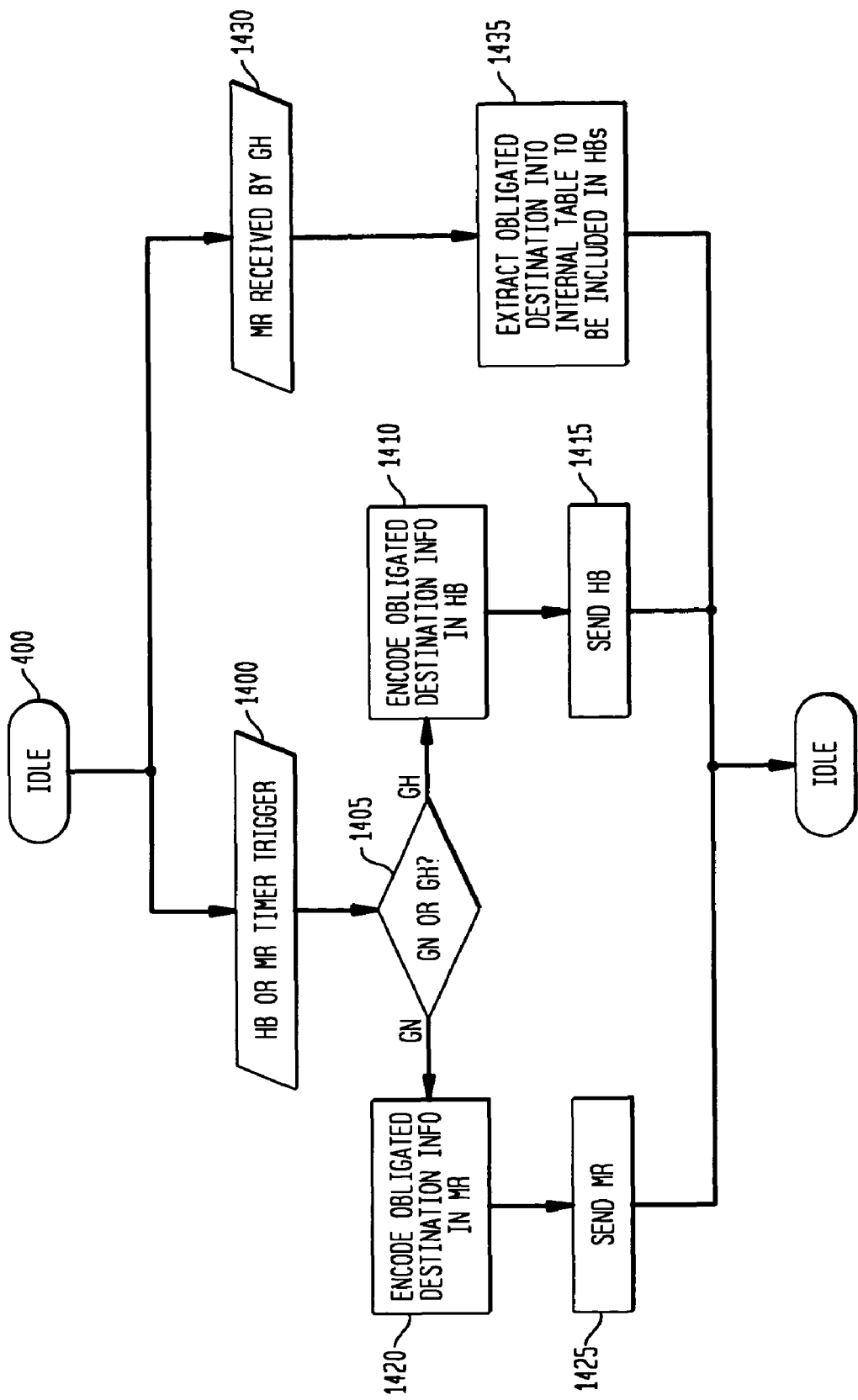
FIG. 14 illustrates a flow diagram for a method of disseminating an obligation foreign destination list according to an embodiment of the invention.

FIG. 14 illustrates a process of advertising or informing other nodes of an obligated foreign destination. The advertisement of an obligated foreign destination list is achieved using the heartbeat message 200 and MR 300. The obligated foreign destination list is added to the heartbeat message 200 and MR 300.

As depicted in FIG. 14, a node 10 starts in an idle state at step 400. A heartbeat message 200 and MR 300 is periodically broadcast. The period is a heartbeat cycle or MR cycle. The period of time between successive heartbeat messages 200 or MRs 300 is counted by a timer or timing means. A heartbeat message 200 and MR 300 is triggered by the expiration of the cycle period. At step 1400, either a heartbeat message 200 or MR 300 is triggered by the expiration of one of the timers. At step 1405, the node 10 determines if it is a regular node (GN) or a GH 25. If the node 10 is a GH 25, the obligated foreign destination list is added or encoded in the heartbeat message 200 as foreign destinations of the LPG 1, at step 1410. The heartbeat message 200 is broadcast at step 1415. The GH 25 returns to an idle state (step 400) thereafter.

If the node 10 is a GN, the obligated foreign destination list is added or encoded in the MR 300, at step 1420. The MR 200 is broadcast at step 1425. The GN returns to an idle state (step 400) thereafter.

At step 1430, the GH 25 receives a MR 300. The GH extracts the obligated foreign destination list from the MR 300, at step 1435 and stores the list for later rebroadcast. The stored obligated destination list will be included in the next heartbeat message. Afterwards, the GH 25 returns to an idle state (step 400).

The invention has been described herein with reference to a particular exemplary embodiment. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. An on-demand method of routing data between a plurality of local peer groups, where each of the local peer groups includes a plurality of moving nodes, the method comprising:

transmitting a route request message from a source node, the route request message includes at least an identifier for a destination node, an identifier of a source node and a previous LPG identifier;

relaying the route request message to a known native boundary node, a node's status as a boundary node is periodically advertised via a periodic broadcast, each node maintains a list of boundary nodes based on said periodic advertisement in said periodic broadcast, the boundary node is selected by a group header node for a renewable time-to-live;

forwarding the route request message to at least one known foreign boundary node;

determining if a destination node corresponding to the identifier for a destination node is within an LPG for the at least one known foreign boundary node;

relaying the route request message to another foreign boundary node if the destination node is not within the LPG;

relaying the route request message to the destination node if the destination node is within the LPG;

receiving the route request message at the destination node;

transmitting a routing response to the source node by the destination node;

relaying the routing response to the source node through a first path discovered by the route request message;

receiving the routing response at the source node; and transmitting the data, upon receipt of the routing response, said data is relayed using a second path discovered by the routing response.

2. The on-demand method of routing data between a plurality of local peer groups, where each of the local peer groups includes a plurality of moving nodes according to claim 1, further comprising the step of:

determining if a node that receives the route request message is the destination node or a boundary node within the LPG for destination node based on said list of boundary nodes.

3. The on-demand method of routing data between a plurality of local peer groups, where each of the local peer groups includes a plurality of moving nodes according to claim 1, further comprising the steps of:

determining if the destination node is in the same LPG as a node receiving the route request message;

determining if a node receiving the route request message is an ingress boundary node; and updating a destination list with an identifier for the source node as an obligated foreign destination if said node receiving the route request messages is determined to be an ingress boundary node and the destination node is not in the same LPG.

4. The on-demand method of routing data between a plurality of local peer groups, where each of the local peer groups includes a plurality of moving nodes according to claim 1, further comprising the step of:

determining if a node receiving the route request message is a relay node based on whether the node has forwarded a membership report from another node.

5. The on-demand method of routing data between a plurality of local peer groups, where each of the local peer groups includes a plurality of moving nodes according to claim 1, further comprising the steps of:

determining if a node receiving the route request message is an egress boundary node; and replacing the previous LPG identifier in the route request message with an LPG identifier for an LPG of the egress boundary node.

6. The on-demand method of routing data between a plurality of local peer groups, where each of the local peer groups includes a plurality of moving nodes according to claim 1, further comprising the steps of:

determining if the source node is in the same LPG as a node receiving the routing response;

determining if a node receiving the routing response is an ingress boundary node; and updating a destination list with an identifier for the destination node as an obligation foreign designation based upon said determining if a node is an ingress boundary node and if the source node is in the same LPG as the node receiving the routing response.

7. The on-demand method of routing data between a plurality of local peer groups, where each of the local peer groups includes a plurality of moving nodes according to claim 1, further comprising the step of:

determining if a node receiving the routing response is a relay node based on whether the node has forwarded a membership report from another node.

8. The on-demand method of routing data between a plurality of local peer groups, where each of the local peer groups includes a plurality of moving nodes according to claim 1, further comprising the steps of:

determining if a node receiving the routing response is an egress boundary node; and replacing a next LPG identifier in the routing response with an LPG identifier for an LPG of the egress boundary node.

9. The on-demand method of routing data between a plurality of local peer groups, where each of the local peer groups includes a plurality of moving nodes according to claim 1, further comprising the step of maintaining a route from a source node to a destination node until the data has been received by the destination node.

10. The on-demand method of routing data between a plurality of local peer groups, where each of the local peer groups includes a plurality of moving nodes according to claim 9, wherein the step of maintaining a route includes the sub-steps of:

detecting if a node has changed LPGs;

transmitting a notification to all nodes within an LPG that a node has changed LPG;

determining if a node that detected a change is a boundary node; and adding an identifier for the node that changed LPG into a routing table as an obligated foreign destination, if the node is determined to be a boundary node.

11. The on-demand method of routing data between a plurality of local peer groups, where each of the local peer groups includes a plurality of moving nodes according to claim 1, further comprising the steps of:

maintaining the first path until the routing response is received by the source node; and maintaining the second path until the data is received by the destination node.

12. The on-demand method of routing data between a plurality of local peer groups, where each of the local peer groups includes a plurality of moving nodes according to claim 1, wherein said route request message further includes a maximum hop count and an incremented hop count, and wherein said on-demand method further comprising the steps of:

incrementing a hop count each time said route request message is forwarded and relayed;

comparing the incremented hop count with the maximum hop count; and forwarding said route request message if said incremented hop count is less than the maximum hop count.

13. The on-demand method of routing data between a plurality of local peer groups, where each of the local peer groups includes a plurality of moving nodes according to claim 1, wherein at least one of the local peer groups includes multiple known boundary nodes and said route request message further includes an identifier for a target boundary node selected from said multiple known boundary nodes and an identifier for a next hop node towards said target boundary node, said target boundary node is determined based on a direction of said destination node.

* * * * *